US012263689B2

(12) United States Patent
Sato et al.

(10) Patent No.: US 12,263,689 B2
(45) Date of Patent: Apr. 1, 2025

(54) PRINTING APPARATUS

(71) Applicant: CANON KABUSHIKI KAISHA, Tokyo (JP)

(72) Inventors: Kyohei Sato, Kanagawa (JP); Masakazu Tsukuda, Kanagawa (JP); Yukimichi Kimura, Kanagawa (JP); Shingo Horita, Kanagawa (JP); Toshiki Hamanishi, Kanagawa (JP); Yusuke Nishiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/346,446

(22) Filed: Jul. 3, 2023

(65) Prior Publication Data

US 2024/0017558 A1 Jan. 18, 2024

(30) Foreign Application Priority Data

Jul. 13, 2022 (JP) ................................ 2022-112455

(51) Int. Cl.
*B41J 29/02* (2006.01)
*B41J 25/308* (2006.01)

(52) U.S. Cl.
CPC ........... *B41J 25/3088* (2013.01); *B41J 29/02* (2013.01)

(58) Field of Classification Search
None
See application file for complete search history.

(56) References Cited

U.S. PATENT DOCUMENTS

| | | | | | |
|---|---|---|---|---|---|
| 4,772,899 | A * | 9/1988 | Mamiya | .................. | B41J 19/00 184/5 |
| 6,520,622 | B1 * | 2/2003 | Yusef | ...................... | B41J 19/20 347/37 |
| 8,419,155 | B2 | 4/2013 | Kawakami | | |
| 9,802,426 | B2 | 10/2017 | Onuma | | |
| 10,071,572 | B2 | 9/2018 | Kurata | | |
| 10,183,505 | B2 | 1/2019 | Ogasawara | | |
| 10,543,698 | B2 | 1/2020 | Onuma | | |
| 10,549,554 | B2 | 2/2020 | Kurata | | |
| 10,889,134 | B2 | 1/2021 | Ishida | | |
| 11,207,905 | B2 | 12/2021 | Matsuo | | |
| 2022/0258479 | A1 | 8/2022 | Tsukuda | | |

FOREIGN PATENT DOCUMENTS

JP 2014-014958 A 1/2014

* cited by examiner

*Primary Examiner* — Leslie J Evanisko
(74) *Attorney, Agent, or Firm* — Venable LLP

(57) ABSTRACT

Provided is a printing apparatus capable of reducing degradation of print quality. To this end, a chassis that guides movement of a carriage in an X-direction and a bridging member that connects the upper surface of a first sidewall and the upper surface of the chassis engage with and are positioned at a base and secured to the base with fastening members.

15 Claims, 27 Drawing Sheets

PRINTING APPARATUS

BACKGROUND OF THE INVENTION

Field of the Invention

The present invention relates to a printing apparatus that performs printing by ejecting liquid from an ejection head to a printing medium.

Description of the Related Art

Liquid ejection apparatuses such as a serial-type inkjet printing apparatus form an image on a printing medium by ejecting ink from a head mounted on a carriage, and are required to perform highly-precise carriage scanning because the precision of landing of the ink affects the image quality. Japanese Patent Laid-Open No. 2014-14958 discloses a configuration having a first rail member and a second rail member that are capable of supporting a carriage and guiding the carriage in a scanning direction. The first and second rail members are provided at respective ends along a direction intersecting with the carriage scanning direction (i.e., at an upstream side and at a downstream side in a conveyance direction).

However, in recent years, there have been increasing demands for more inexpensive inkjet printing apparatuses such as printers for personal use. For this reason, there are demands for a transition from a configuration in which a carriage is held both at the upstream side and the downstream side in the conveyance direction, like in Japanese Patent Laid-Open No. 2014-14958, to a configuration in which the carriage is held only at the upstream side in the conveyance direction. However, in such a configuration where a chassis is held at a base only at one side in the conveyance direction, the image quality may degrade because of an unstable attitude of the carriage.

SUMMARY OF THE INVENTION

In view of the above, the present invention provides a printing apparatus capable of stabilizing the attitude of the carriage in the scanning direction and printing a high-quality image on a printing medium.

A printing apparatus includes: a printing unit that ejects liquid; a carriage mounted on the printing unit and movable in a scanning direction; a base having a flat surface portion, a first sidewall uprightly provided at the flat surface portion, and a second sidewall uprightly provided at the flat surface portion, facing the first sidewall; a chassis positioned and held at the base and capable of supporting the carriage while guiding the carriage in the scanning direction; and a bridging member connecting the first sidewall and the chassis, in which at a first end portion in a first direction intersecting with the scanning direction, the bridging member is positioned by engaging with a top surface portion of the chassis, the top surface portion being at an end portion of the chassis opposite from an end portion of the chassis secured to the base.

The present invention can provide a printing apparatus capable of reducing degradation in print quality.

Further features of the present invention will become apparent from the following description of exemplary embodiments with reference to the attached drawings.

DESCRIPTION OF THE EMBODIMENTS

An embodiment of the present invention is described below with reference to the drawings.

Figure 1:
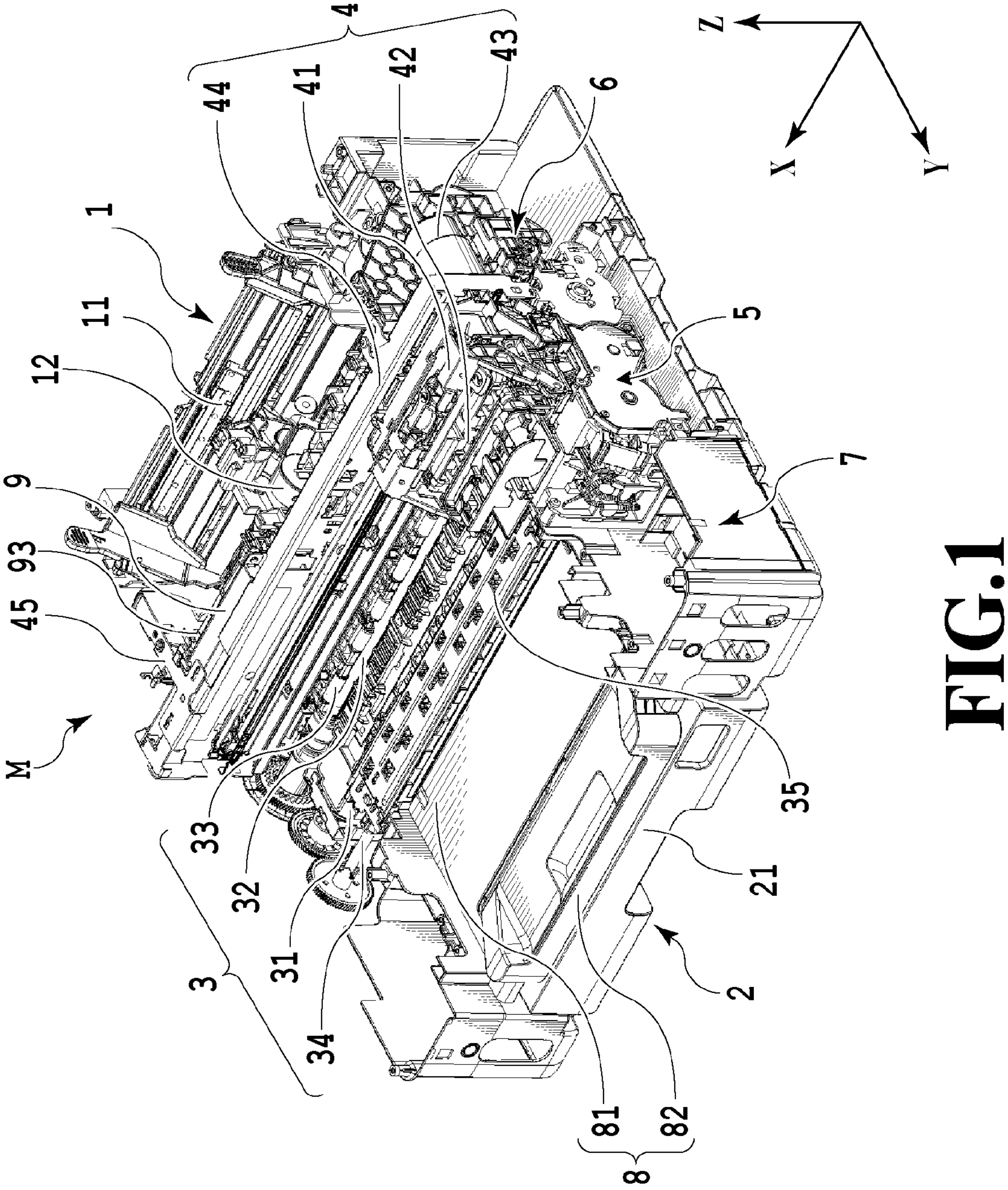
FIG. 1 is a perspective view showing an internal configuration of a printing apparatus.

FIG. 1 is a perspective view showing an internal configuration of a printing apparatus M to which the present embodiment can be applied. The printing apparatus M is a multifunctional machine including a printer part and a scanner part (not shown) which is disposed above the printer part, and executes various kinds of processes related to image printing operation and scanning operation in the printer part and the scanner part individually or in cooperation with each other. The scanner part includes an auto document feeder (ADF) and a flatbed scanner (FBS) and is capable of reading an original automatically fed by the ADF and reading (scanning) an original placed by a user on the original scanning bed of the FBS. Although the present embodiment is a multifunctional machine having both of the printer part and the scanner part, it is to be noted that a mode without the scanner part may be employed instead.

The printer part includes a first sheet feed unit 1 and a second sheet feed unit 2 on which to stack printing media, a conveyance unit 3 that conveys a printing medium fed from either one of the sheet feed units, a print unit 4 that prints an image on a printing medium conveyed by the conveyance unit 3, and a sheet discharge unit 8 on which to stack the printing medium discharged after having the image printed thereon. The printer part further includes a maintenance unit 5 that maintains the print unit 4 and a driving unit 6 that transmits a driving force from a conveyance motor 31 in the conveyance unit 3 to one of the first sheet feed unit 1, the second sheet feed unit 2, and the maintenance unit 5 by switching a driving target between them.

The print unit 4 includes a print head 42 that ejects liquid and a carriage 41 that moves with the print head 42 being mounted thereon. The carriage 41 on which the print head 42 is mounted is supported by a chassis 44 extending in an X-direction which is a main scanning direction (the direction in which the carriage moves) and is configured to be able to reciprocate in the X-direction. The print unit 4 also includes portion 43. The sheet discharge unit 8 includes a printing medium stacker 81 and a pullable extension tray 82 that can support a printing medium even in a case where the size of the printing medium is large in a Y-direction. The printer part is formed by the above units fastened to a base 7. Also, a circuit board 9 that controls the operation of each unit is held by a guide 93 and positioned at the base 7 and the chassis 44.

Figure 2:
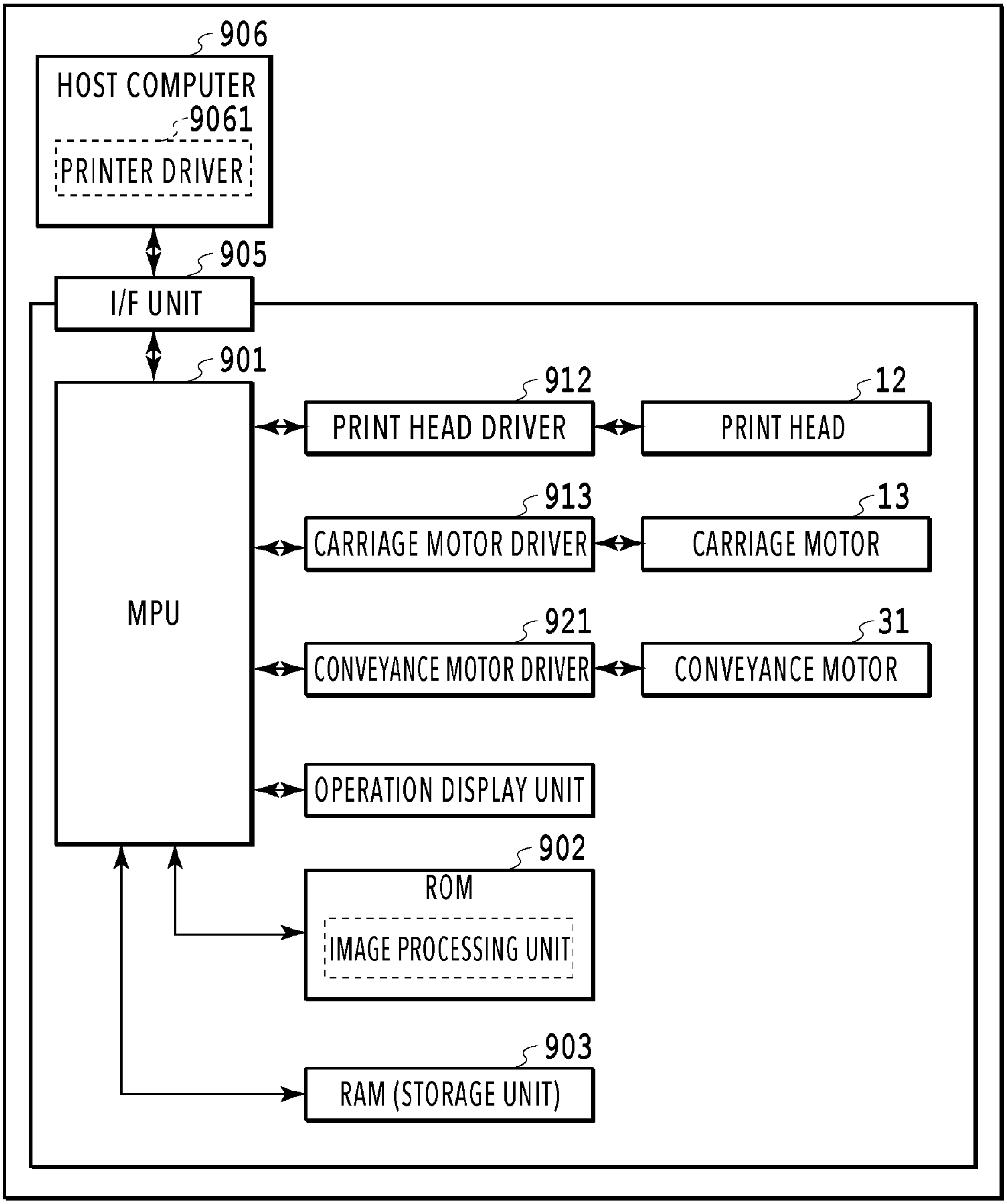
FIG. 2 is a block diagram showing the control configuration of the printing apparatus.

FIG. 2 is a block diagram showing the control configuration of the printing apparatus M of the present embodiment. A microprocessor unit (MPU) 901 controls the operation of each unit, data processing, and the like. A ROM 902 stores data and programs to be executed by the MPU 901. A RAM 903 temporarily stores processing data executed by the MPU 901 and data received from a host computer 906. The print head 42 is controlled by a print head driver 912. The carriage 41 is driven by a carriage motor 13. The carriage motor 13 is controlled by a carriage motor driver 913. A conveyance roller 32 and a discharge roller 34 are driven by the conveyance motor 31. The conveyance motor 31 is controlled by a conveyance motor driver 921. The host computer 906 has a printer driver 9061 for processing a print image and print information such as image quality and communicating with the printing apparatus M in response to an instruction to execute a printing operation from a user. The MPU 901 communicates a print image and the like with the host computer 906 via an OF unit 905.

Figure 3:
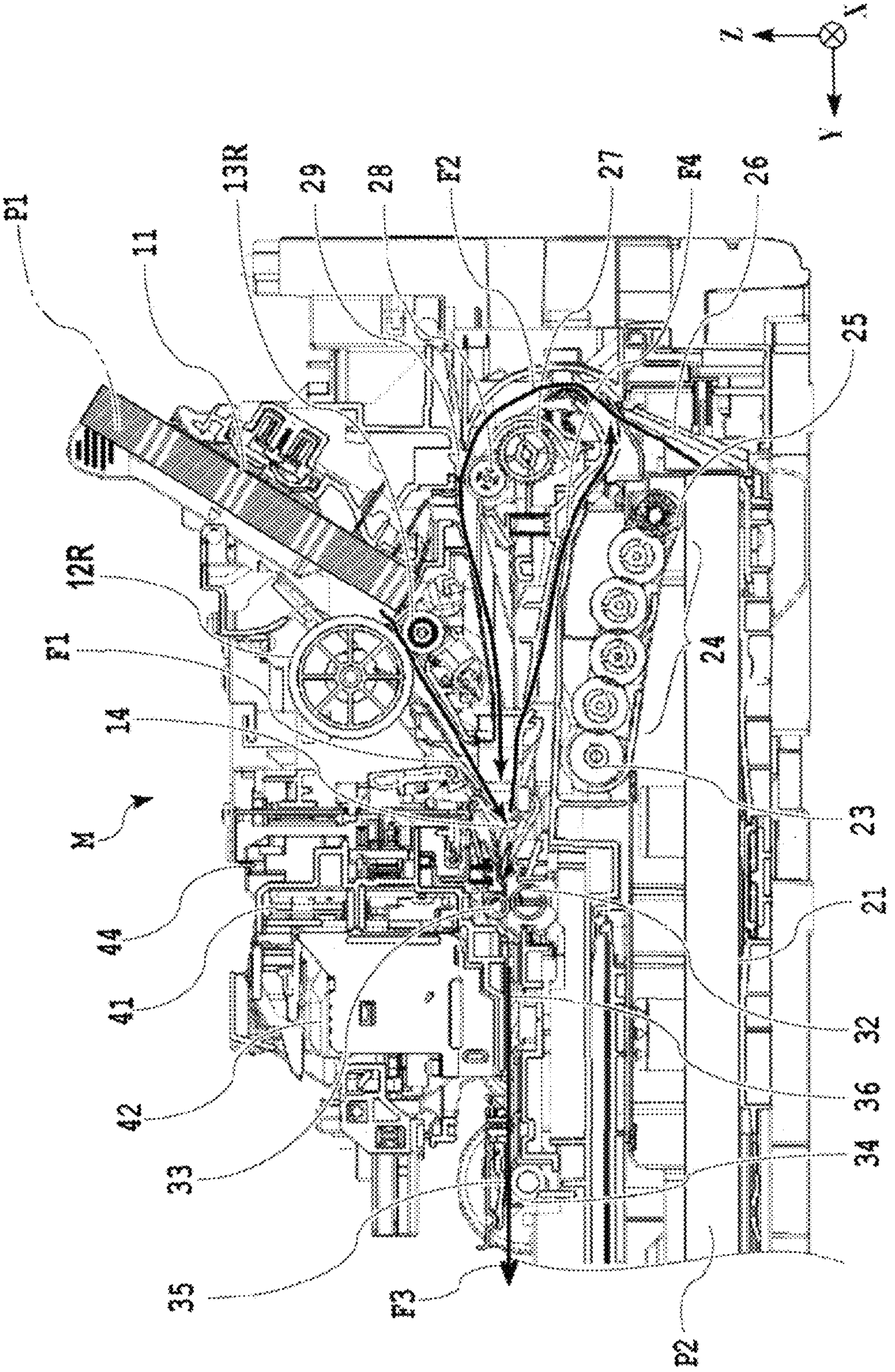
FIG. 3 is a partial sectional view showing the printing apparatus.

FIG. 3 is a partial sectional view showing the printing apparatus M of the present embodiment. There are two methods for a user to set a print medium in the printing apparatus M: (1) setting a print medium P1 on the first sheet feed unit 1 by setting the printing medium P1 on a pressure plate 11 and (2) setting a printing medium P2 on the second sheet feed unit 2 by stacking the printing medium P2 on a detachable cassette case 21 and attaching the cassette case 21 to the printing apparatus M. Once print information from a user is instructed to the printing apparatus M, the conveyance motor 31 rotates in a forward direction.

In a mode where a printing medium is fed from the first sheet feed unit 1, the driving unit 6 is connected to the first sheet feed unit 1 to drive the first sheet feed unit 1, and sheet feed is started by abutment between the pressure plate 11 and a first sheet feed roller 12R driven and rotated by the conveyance motor 31. A separation roller 13R to give resistance to sheet feed of a printing medium is disposed at a position facing the first sheet feed roller 12R, and thus, only the uppermost one of the printing media P1 stacked on the pressure plate 11 is fed to the conveyance unit 3 as indicated by arrow F1.

Also, in a mode where a printing medium P2 is fed from the second sheet feed unit 2, the driving unit 6 is connected to the second sheet feed unit 2 to drive the second sheet feed unit 2. As the conveyance motor 31 is driven, the driving force is transmitted to the second sheet feed unit 2, and as the driving unit 6 is driven, the driving force is transmitted to a second sheet feed shaft gear 23. The printing medium P2 stacked on the second sheet feed unit 2 is fed by a second sheet feed roller 25 via the second sheet feed shaft gear 23 and a plurality of second sheet feed idler gears 24. By being provided with a separation unit 26 to give resistance to printing media, the printing apparatus M of the present embodiment feeds only the uppermost one of the printing media P2. Irrespective of whether the conveyance motor 31 rotates forward or backward, a printing medium is fed to the conveyance unit 3 as indicated by arrow F2 by a nipping force exerted by an intermediate roller 28 driven by the driving unit 6 only in one direction via an intermediate gear 27 and a driven roller 29 provided with a bias force.

A printing medium fed from either one of the sheet feed units passes through a printing medium detection lever 14 and is then aligned in the positions of the left and right portions of the leading edge of the printing medium relative to the conveyance direction intersecting with the main scanning direction (the X-direction) by a conveyance roller pair formed by the conveyance roller 32 and a pinch roller 33 driven by the conveyance roller 32. As the printing medium conveyed by the conveyance roller pair passes above a platen 36 which is provided at a position facing the print unit 4 and which biases the printing medium, an image is printed on the printing medium by the print head 42. In one-side printing mode, the printing medium on which the image has been printed travels through a discharge roller pair formed by the discharge roller 34 and a spur 35 as indicated by arrow F3 and is discharged to the sheet discharge unit 8.

Meanwhile, in double-side printing mode, after an image is printed on one side of the printing medium, the conveyance motor 31 is rotated backward with the printing medium being sandwiched by the discharge roller pair and not passing through the discharge roller pair. Thus, the discharge roller pair and the conveyance roller pair can rotate backward opposite from the conveyance direction for image printing and convey the printing medium to a reverse conveyance path as indicated by arrow F4.

Once the trailing edge of the printing medium passes through conveyance roller pair, the conveyance motor 31 is switched back to forward rotation, so that the conveyance roller pair may re-align the positions of the left and right portions of the leading edge of the printing medium relative to the conveyance direction. After that, the operation is repeated to print an image on the other side of the printing medium, and the printing medium on which images have been printed travels through the discharge roller pair formed by the discharge roller 34 and the spur 35 as indicated by arrow F3 and is discharged to the sheet discharge unit 8.

Figure 4:
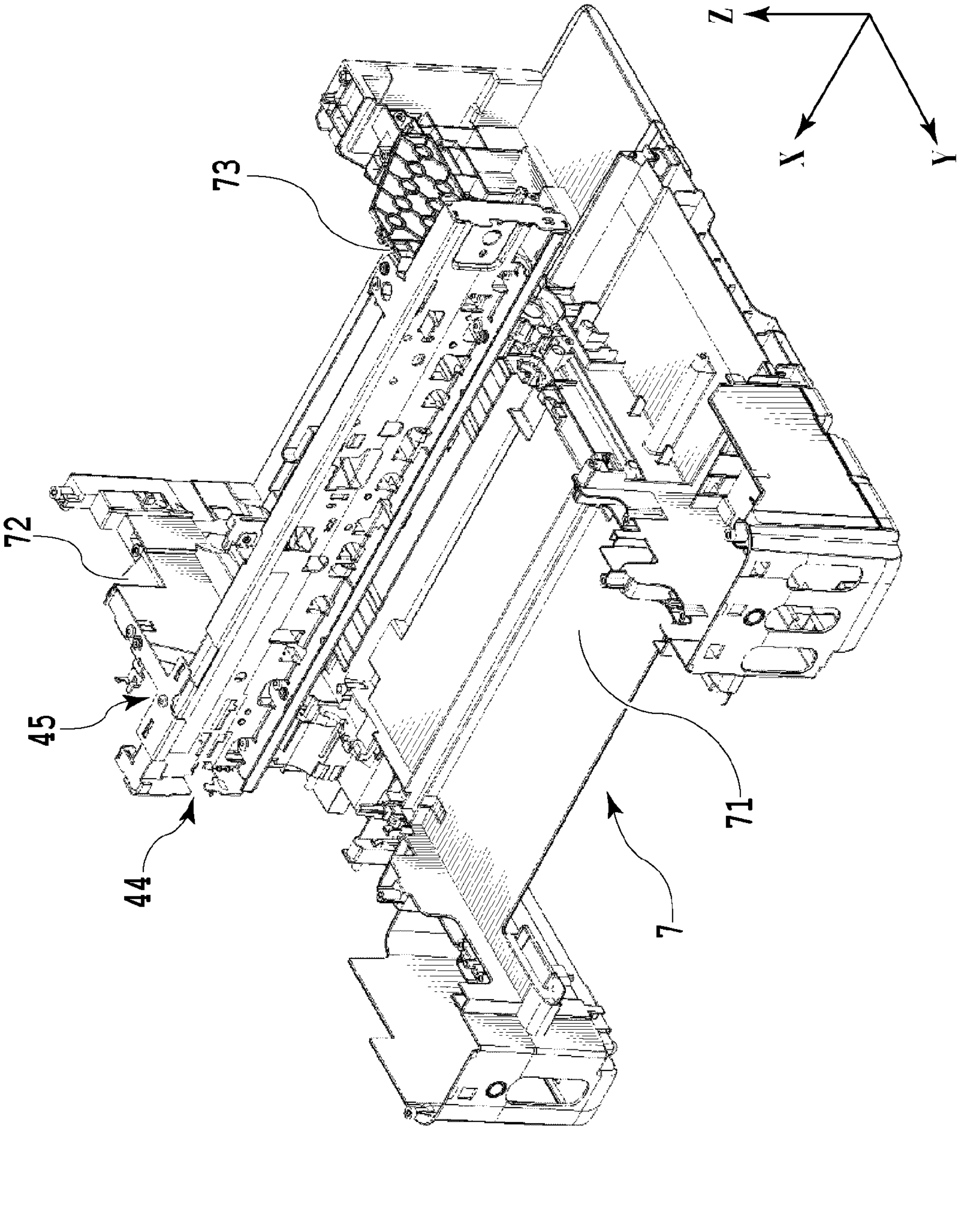
FIG. 4 is a perspective view showing a chassis and a bridging member positioned at a base.

FIG. 4 is a perspective view showing the chassis 44 and a bridging member 45 positioned at the base 7. The following describes the characteristic configuration of the present embodiment. Note that the term "rear surface" used in the present embodiment refers to a surface on the −Y-direction side.

The base 7 is formed integrally by molding using a resin material and has a flat surface portion 71. The base 7 also has a first sidewall 72 on the left side and a second sidewall 73 on the right side, both extending in the Y-direction which is the sheet conveyance direction. The chassis 44 formed of sheet metal is positioned and held at the first sidewall 72 and the second sidewall 73 of the base 7. The circuit board 9 described with FIG. 1 is held and disposed between the rear surface portion of the chassis 44 and the first sidewall 72 of the base 7. For this reason, at the first sidewall 72 side of the base 7, the bridging member 45, which is formed of sheet metal and also used for holding the circuit board 9, connects the chassis 44 and the first sidewall 72 so that they are positioned and held.

Now, in order to describe a configuration of how the chassis 44 and the bridging member 45 are positioned and held at the base 7, a detailed description is given of each of the following components: the base 7, the chassis 44, and the bridging member 45.

Figure 5:
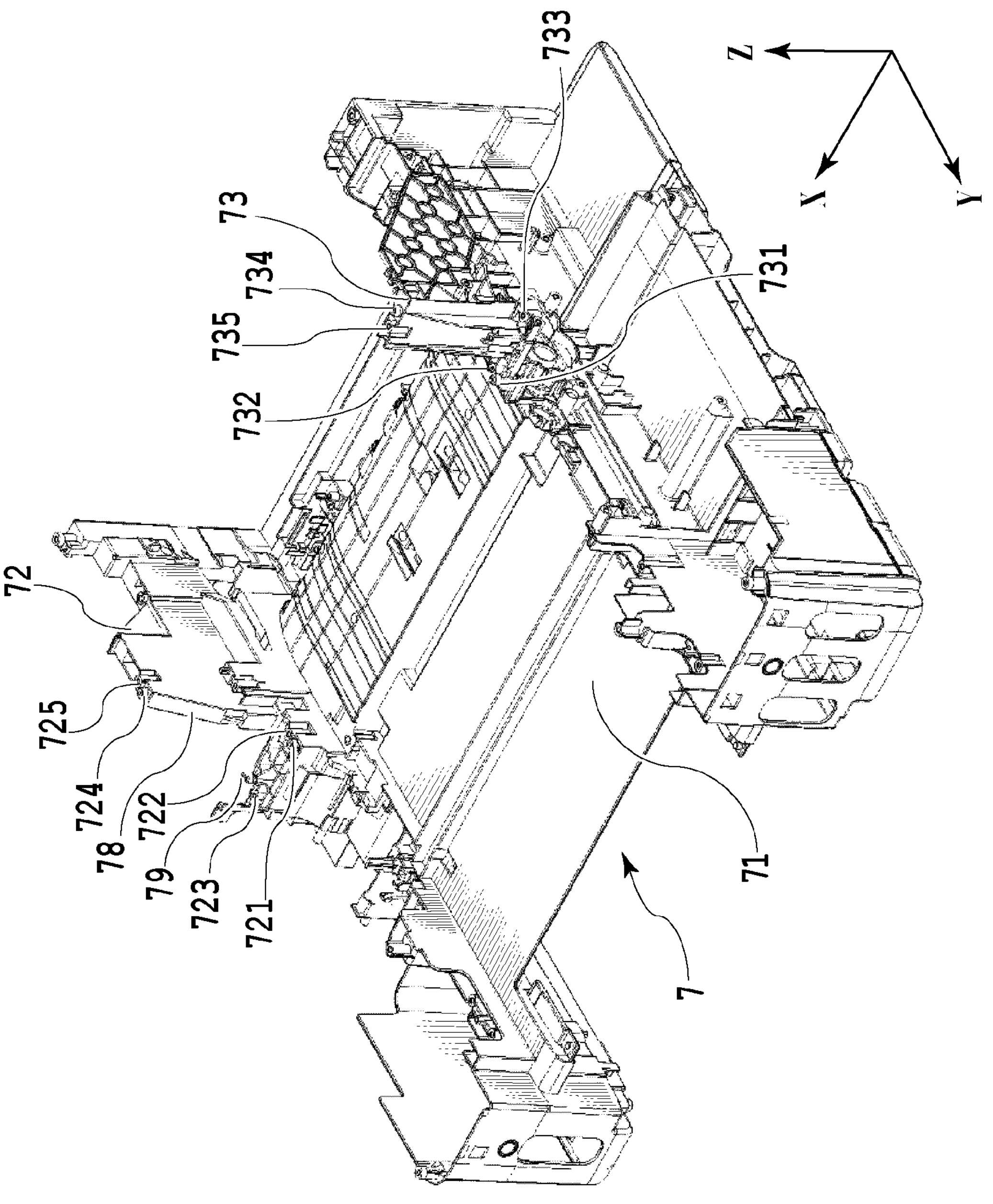
FIG. 5 is a perspective view showing the base.

FIG. 5 is a perspective view showing the base 7. An engagement portion 721 such as a boss is provided at a lower surface portion of the first sidewall 72 of the base 7, protruding upward in the direction of gravitational force (in the Z-direction) to engage with a lower surface portion of the chassis 44. Further, fastening portions 722 and 723 are provided side by side in the X-direction at the lower surface portion of the first sidewall 72 of the base 7, each having a contact surface and a hole for fastening to the lower surface portion of the chassis 44 with a fastening member such as a screw. Although two fastening portions are provided in the present embodiment, the number of the fastening portions is not limited to two as long as there is at least one of them, and there may be three or more fastening portions as well. Also, an engagement portion 724, such as a boss, is provided at an upper surface portion of the first sidewall 72 of the base 7, protruding upward (the Z-direction) to engage with the bridging member 45. Further, the upper surface portion of the first sidewall 72 has a hole to be fastened with a fastening member such as a screw and a second surface 725 with which a surface 455 of the bridging member 45 to be described later is to come into contact. Note that a tip end portion of the base 7 in a direction in which the first sidewall 72 uprightly extends is referred to as an upper surface portion herein.

As is similar to the lower surface portion of the first sidewall 72, an engagement portion 731 such as a boss is provided at a lower surface portion of the second sidewall 73 as well, protruding upward (the Z-direction) to engage with the chassis 44. Further, fastening portions 732 and 733 are provided side by side in the X-direction at the lower surface portion of the second sidewall 73, each having a contact surface and a hole for fastening to a lower surface portion of the chassis 44. Also, an engagement portion 734 such as a boss is provided at an upper surface portion of the second sidewall 73 of the base 7, protruding upward (the Z-direction) to engage with an upper surface portion of the chassis 44. Further, the upper surface portion of the second sidewall 73 has a fourth surface 735 with which a third surface 4424 of the chassis 44 to be described later is to come into contact and which has a hole that can be fastened with a fastening member such as a screw.

Figure 6A:
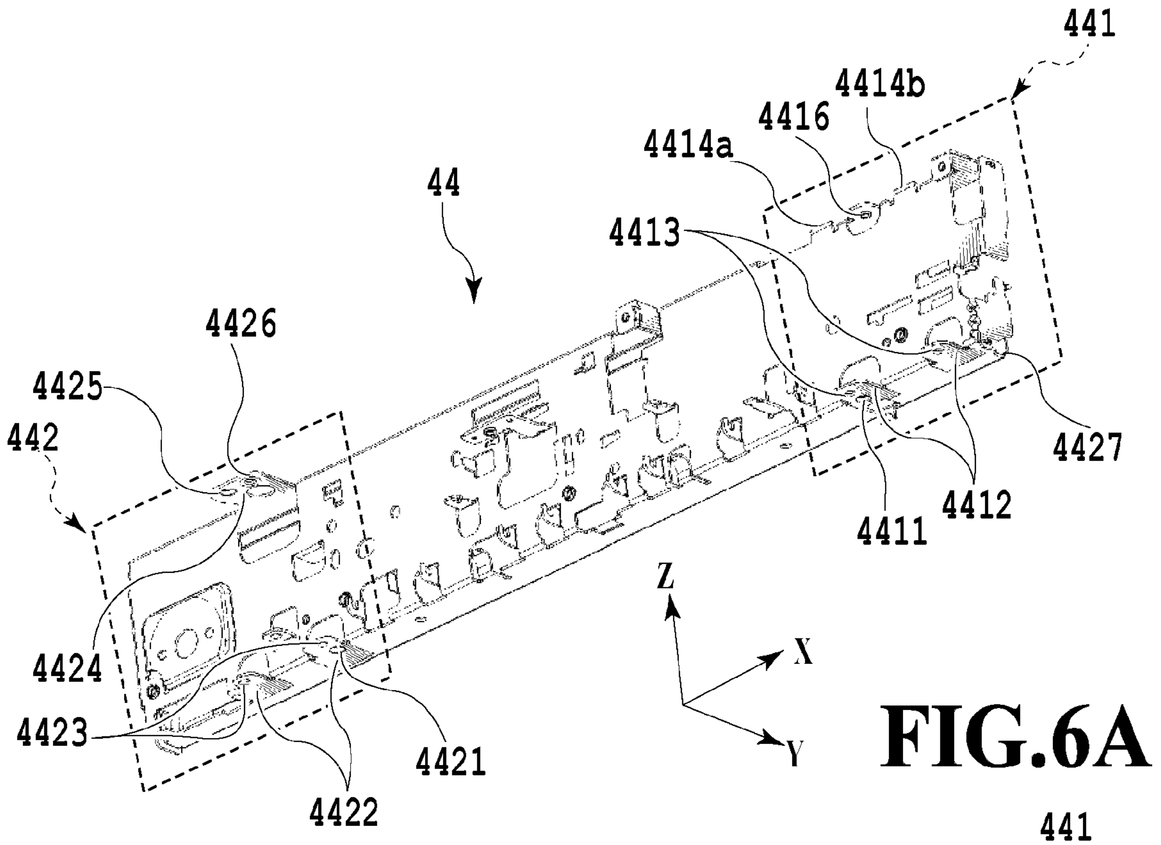
FIG. 6A is a perspective view showing the chassis.
Figure 6B:
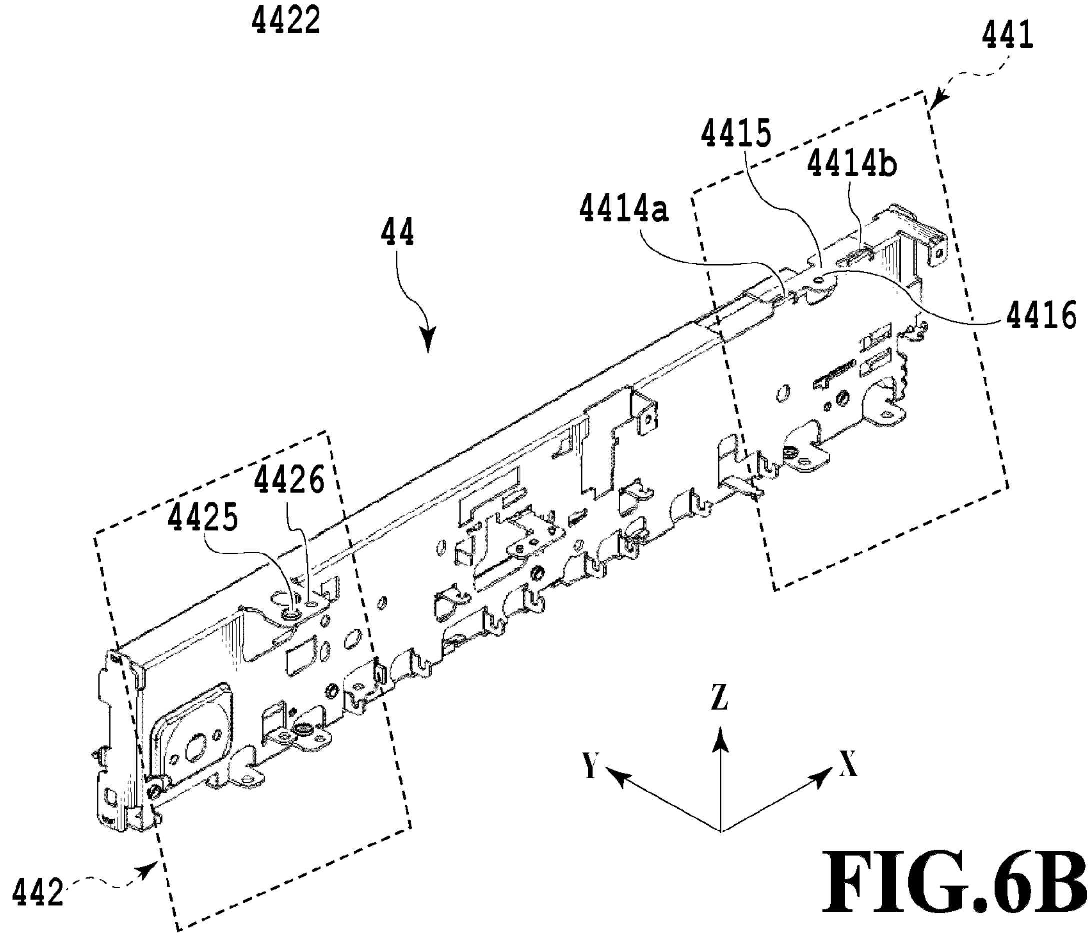
FIG. 6B is a perspective view showing the chassis.

FIGS. 6A and 6B are perspective views showing the chassis 44. FIG. 6A is a view of the chassis 44 seen from the bottom surface side, and FIG. 6B is a view of the chassis 44 seen from the top surface side. The top surface of the chassis 44 is an end portion of the chassis 44 which is on the opposite side from an end portion thereof fixed to the base 7. Fastening surfaces 4412 to come into contact with the lower surface portion of the first sidewall 72 of the base 7 are formed by lancing at a lower surface portion of a side portion 441 of the chassis 44 closer to the first sidewall 72 of the base 7, extending from the bottom surface of the chassis. At the fastening surfaces 4412, an engagement hole 4411 for engagement with the lower surface portion of the first sidewall 72 of the base 7 and holes 4413 for fastening with fastening members such as screws are provided side by side in the X-direction.

As is similar to the side portion 441 on the first sidewall 72 side, fastening surfaces 4422 to come into contact with the lower surface portion of the second sidewall 73 are formed by lancing at a lower surface portion of a side portion 442 of the chassis 44 closer to the second sidewall 73 of the base 7, extending from the bottom surface of the chassis 44. At the fastening surfaces 4422, an engagement hole 4421 for engagement with the lower surface portion of the second sidewall 73 of the base 7 and holes 4423 for fastening with fastening members such as screws are provided side by side in the X-direction. Also, as shown in FIG. 6B, engagement portions (protruding portions) 4414*a* and

4414*b* to engage with the bridging member 45 are provided at a top surface portion of the side portion 441 of the chassis 44 closer to the first sidewall 72 of the base 7. The engagement portions 4414*a* and 4414*b* are formed by lancing, protruding upward (the Z-direction) from the rear surface of the chassis 44 and extending in the X-direction.

A top surface portion of the side portion 441 of the chassis 44 has a first surface 4415 with which the bridging member 45 is to come into contact, and there, a fastening hole 4416 for fastening to the bridging member 45 with a fastening member such as a screw is provided. Meanwhile, as shown in FIG. 6A, the third surface 4424 to come into contact with the fourth surface 735 of the second sidewall 73 of the base 7 described earlier is provided at an upper surface portion of the side portion 442 of the chassis 44. The third surface 4424 is provided with an engagement hole 4425 for engagement with the upper surface portion of the base 7 and a hole 4426 for fastening with a fastening member such as a screw, the engagement hole 4425 and the hole 4426 being located on the back surface of a shape portion which is formed by lancing and extends from the top surface of the chassis 44.

Also, a rail portion 4427 is provided at a lower surface portion of the chassis 44 to support the carriage 41 and serve as a rail for the carriage 41 to move. The rail portion 4427 is formed by lancing at a lower surface portion.

Figure 7:
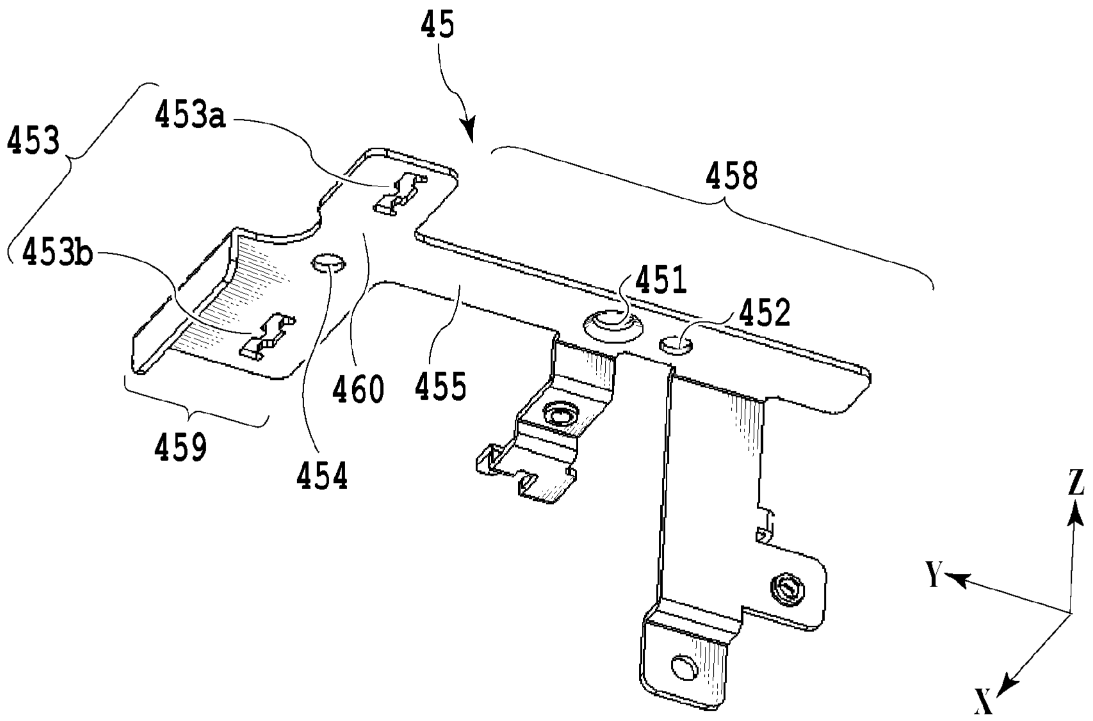
FIG. 7 is a perspective view showing the bridging member.

FIG. 7 is a perspective view showing the bridging member 45. The bridging member 45 is formed by bending sheet metal as shown in FIG. 7 and enables the chassis 44 and the first sidewall 72 to be connected and positioned. The bridging member 45 includes a main body portion 458 and a joint portion 459, and the main body portion 458 is provided with an engagement hole 451 to engage with the base 7 and a hole 452 for fastening to the base 7, which are arranged side by side in the Y-direction. Also, the joint portion 459 is provided with two engagement holes 453*a* and 453*b* to engage with the chassis 44 and a hole 454 for fastening to the chassis. The number of the engagement holes 453 to engage with the chassis 44 is not limited to any particular number as long as there is at least one of them, and there may be more than one, like in the present embodiment. The bottom surface of the bridging member 45 is formed by a surface 460 to come into contact with the first surface 4415 of the chassis 44 and the surface 455 to come into contact with the second surface 725 of the base 7, the surface 460 and the surface 455 extending to form a single surface.

Figure 8A:
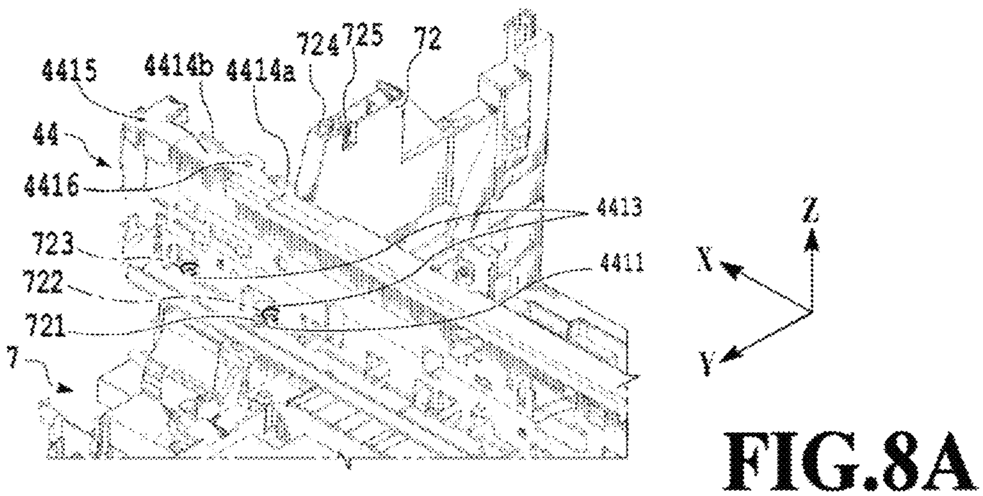
FIG. 8A is a diagram showing a configuration of how the chassis and the bridging member are positioned.
Figure 8B:
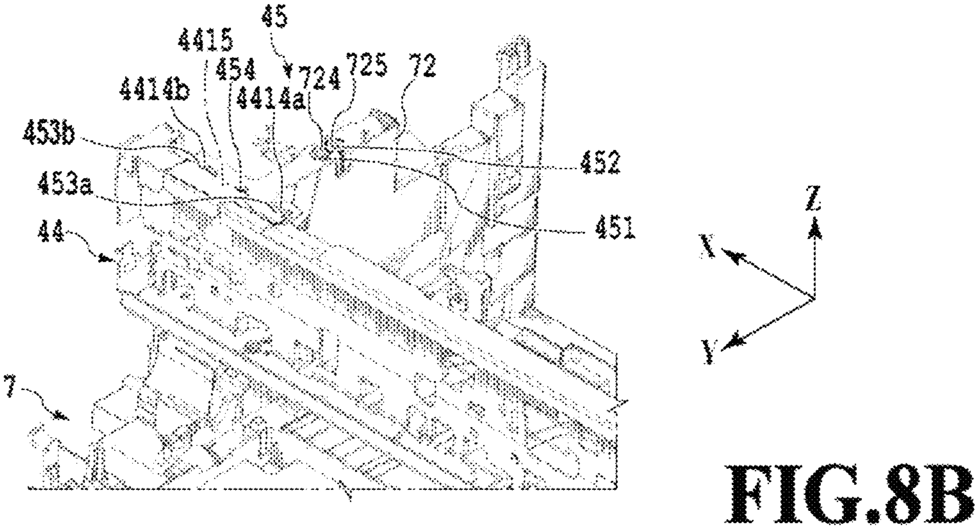
FIG. 8B is a diagram showing a configuration of how the chassis and the bridging member are positioned.
Figure 8C:
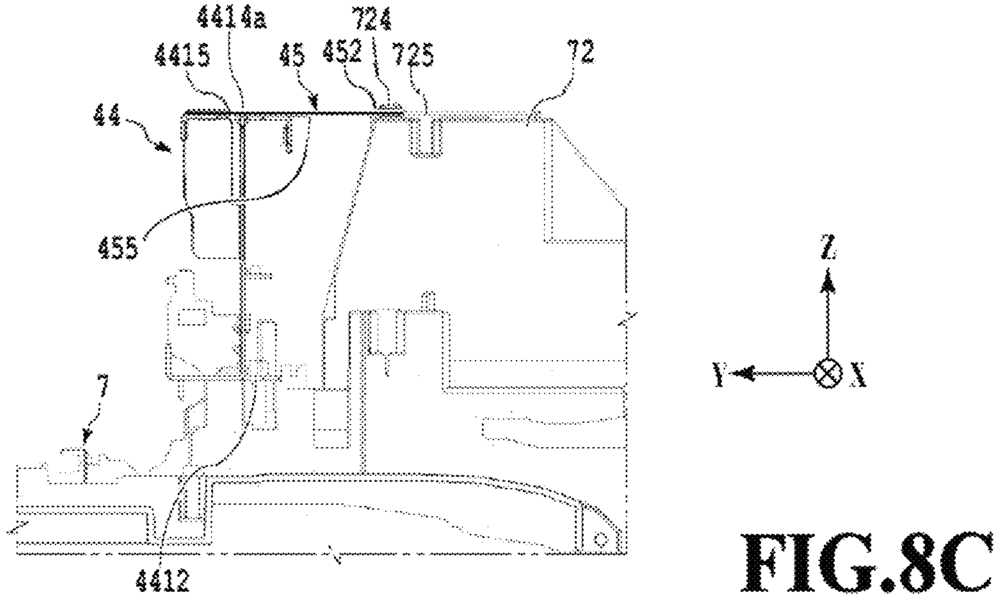
FIG. 8C is a diagram showing a configuration of how the chassis and the bridging member are positioned.

FIGS. 8A to 8C are diagrams showing a configuration of how the chassis 44 and the bridging member 45 are positioned at the first sidewall 72. As shown in FIG. 8A, the engagement portion 721, such as a boss, protruding from the lower surface portion of the base 7 is fit into the engagement hole 4411 of the chassis 44, which enables the chassis 44 to be positioned and held at the base 7 in the X- and Y-directions. Further, the two fastening surfaces 4412 extending from the bottom surface side of the chassis 44 are in contact with the fastening portions 722, 723 of the base 7 and fastened thereto with fastening members such as screws, which enables the chassis 44 to be positioned and secured at the base 7 in the Z-direction.

As shown in FIG. 8B, the engagement portion 724, such as a boss, protruding in the Z-axis direction at the upper surface portion of the first sidewall 72 of the base 7 is fit into the engagement hole 451 of the bridging member 45 which is at the upstream side of the sheet conveyance direction Y. Also, the two engagement holes 453*a* and 453*b* provided at the joint portion 459 of the bridging member 45 engage with the two engagement portions 4414*a* and 4414*b* formed extending from the rear surface of the chassis 44. Then, one of these two engagement portions 4414*a* and 4414*b* restricts the bridging member 45 in the X-direction by fitting, while the other one restricts the bridging member 45 in the Y-direction by fitting. The bridging member 45 is thereby positioned and held in the X- and Y-directions.

The two engagement portions 4414*a*, 4414*b* formed extending from the rear surface of the chassis 44 are formed at an accuracy of a tolerance of sheet thickness of the chassis 44 (approximately −35 μm to +35 μm). By fitting into the engagement holes 453*a*, 453*b* of the bridging member 45, the engagement portions 4414*a*, 4414*b* can favorably maintain the positioning accuracy between the chassis 44 and the bridging member 45 in the Y-direction within the range of the tolerance of sheet thickness.

As shown in FIG. 8C, the surface 455 of the bridging member 45, which is a lower surface, is in contact with the second surface 725 of the base 7 at the upstream side in the Y-direction and is in contact with the first surface 4415 of the chassis 44 at the downstream side in the Y-direction. Then, the bridging member 45 is positioned and secured to the base 7 and the chassis 44 by fastening members such as screws. The bridging member 45 is thus positioned and secured to the base 7 and the chassis 44 in the X-, Y-, and Z-directions.

Figure 9A:
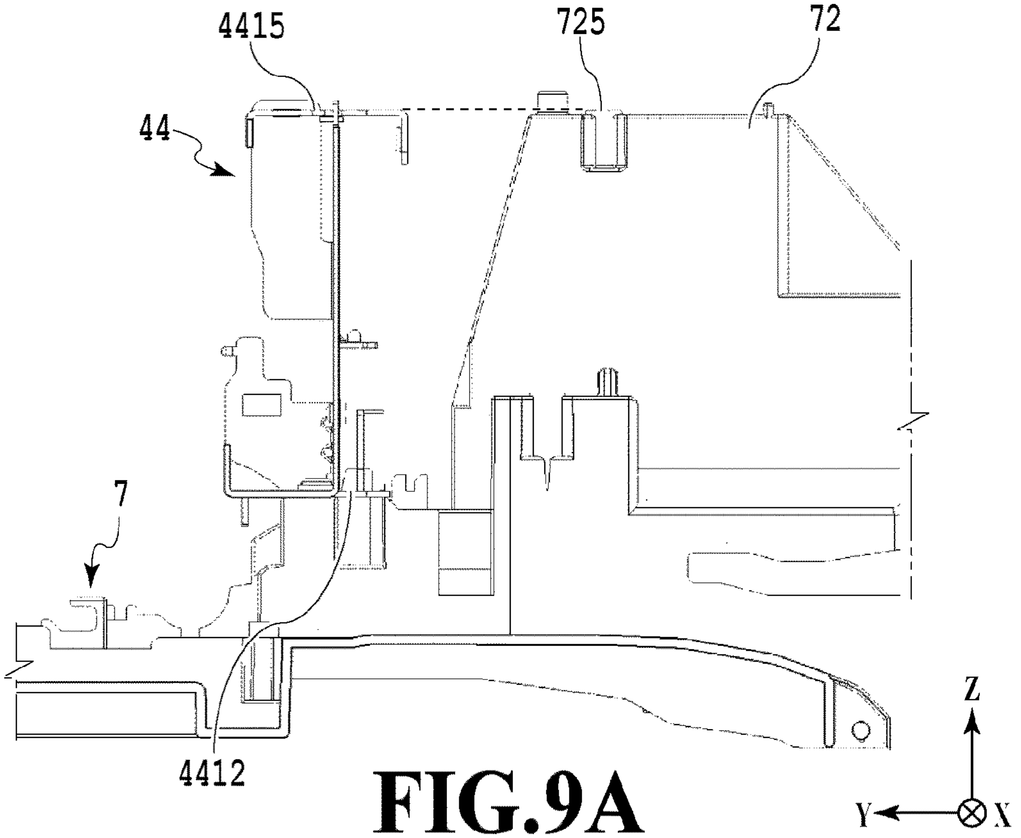
FIG. 9A is a diagram illustrating the relation in height between the chassis and a first sidewall of the base.
Figure 9B:
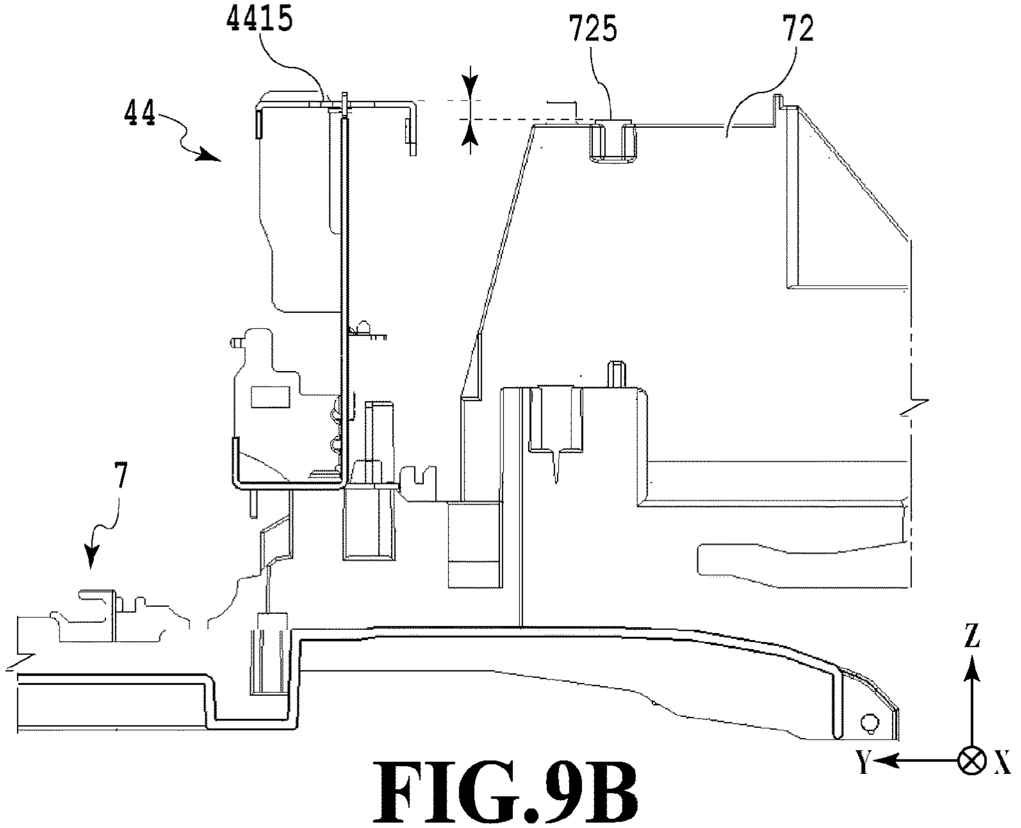
FIG. 9B is a diagram illustrating the relation in height between the chassis and the first sidewall of the base.

FIGS. 9A and 9B are diagrams illustrating the relation in height between the chassis 44 and the first sidewall 72 of the base 7. FIG. 9A shows the positional relation in a case where the first surface 4415 of the chassis 44 and the second surface 725 of the base 7 are at the same height, and FIG. 9B shows the positional relation in a case where the first surface 4415 of the chassis 44 and the second surface 725 of the base 7 are not at the same height. In the present embodiment, the first surface 4415 of the chassis 44 and the second surface 725 of the base 7 are configured to be at substantially the same height in the Z-direction as shown in FIG. 9A. In other words, the lower surface 455 of the bridging member 45 is in contact with the first surface 4415 of the chassis 44 and the second surface 725 of the base 7 which are substantially at the same height.

Now, using FIG. 9B, a case where the first surface 4415 of the chassis 44 and the second surface 725 of the base 7 are not at the same height in the Z-direction is described. As shown in FIG. 9B, in a case where the first surface 4415 of the chassis 44 and the second surface 725 of the base 7 are not at the same height, in fastening of the bridging member 45 with fastening members such as screws, positioning and securing are done with a deforming force being exerted to rotate the chassis 44 about the X-axis. While FIG. 9B shows a case where the first surface 4415 is at a higher position than the surface 725, in a case where the surface 725 is at a higher position than the first surface 4415, positioning and securing are done similarly with a deforming force being exerted to rotate the chassis 44 about the X-axis, although the direction of the force is opposite in that case.

In this way, in a case where the first surface 4415 of the chassis 44 and the second surface 725 of the base 7 are different in height and the positioning and securing are performed with a deforming force being exerted on the chassis 44, the accuracy in the attitude of the carriage 41 may be affected, leading to degradation in the accuracy of landing of droplets onto a printing medium and hence degradation in the printing quality. By contrast, in a case where the first surface 4415 of the chassis 44 and the second surface 725 of the base 7 are substantially at the same height like in the present embodiment, deformation of the chassis 44 upon fastening of the bridging member 45 with fastening members such as screws can be reduced. Thus, the attitude of the carriage 41 can be maintained favorably, which contributes to reduction in degradation of the accuracy in landing of droplets on a print medium and degradation of image quality.

It goes without saying that the height of the first surface 4415 of the chassis 44 and the height of the second surface 725 of the base 7 vary within the range of component tolerance. However, the first surface 4415 of the chassis 44 is formed by two steps of bending work in reference to the fastening surface 4412, and thus, tolerance can be reduced.

Figure 10:
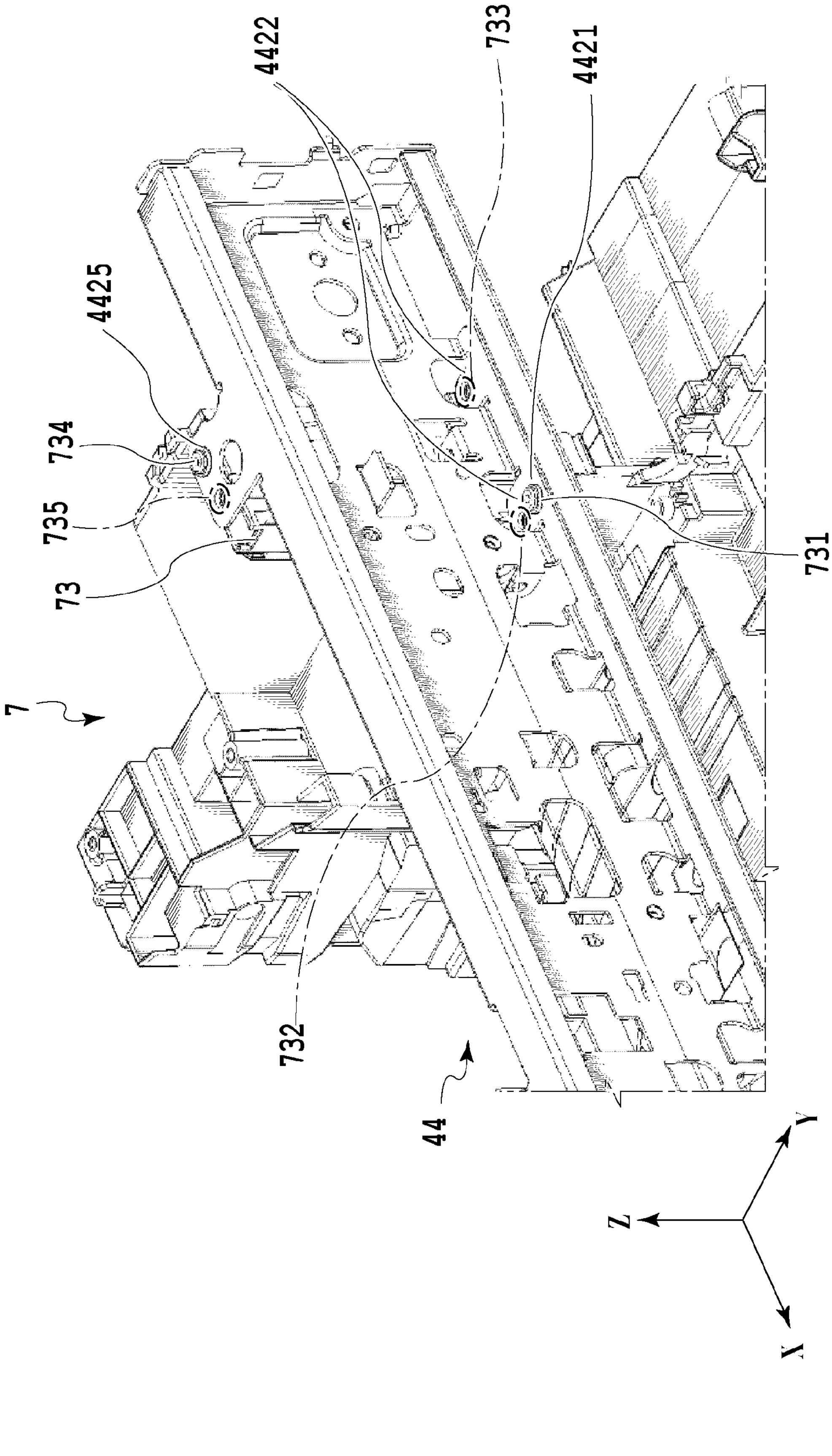
FIG. 10 is a perspective view showing a configuration of how the chassis is positioned and held at a second sidewall.

FIG. 10 is a perspective view showing a configuration of how the chassis 44 is positioned and held at the second sidewall 73 of the base 7. As is similar to the first sidewall 72, the positioning and holding configuration for the lower surface portion of the base 7 and the chassis 44 is such that the engagement portion 731, such as a boss, protruding from the base 7 is fit into the engagement hole 4421 of the chassis 44 to position and hold the chassis 44 at the base 7 in the X- and Y-directions. Further, the two fastening surfaces 4422 extending at the lower portion of the chassis 44 are in contact with the fastening portions 732, 733 of the base 7, so that the chassis 44 is positioned and secured in the Z-direction by fastening members such as screws.

Meanwhile, the positioning and holding configuration for the upper surface portion of the base 7 and the chassis 44 is such that the engagement portion 734, such as a boss, protruding in the Z-direction at the upper surface portion of the base 7 is fit into the engagement hole 4425 formed in the third surface 4424 extending from the top surface of the chassis 44, so that the chassis 44 is positioned and held in the X- and Y-directions.

Figure 11:
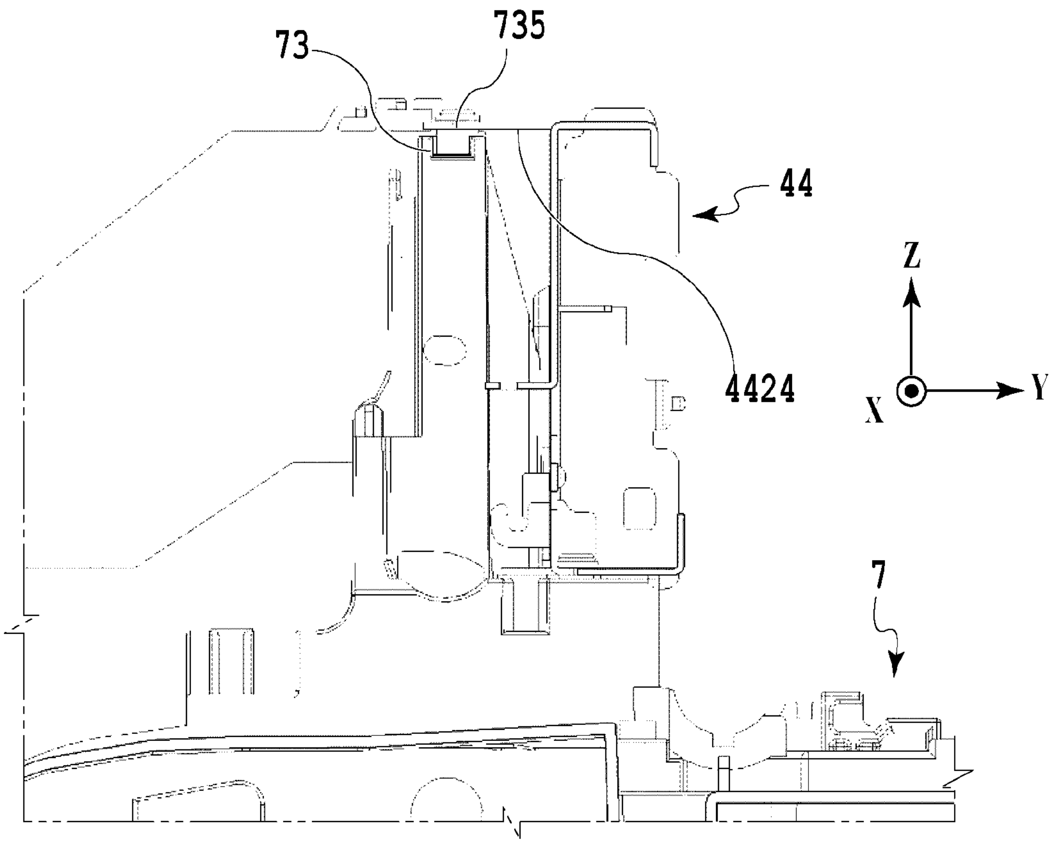
FIG. 11 is a side sectional view showing the chassis secured to the base.

FIG. 11 is a side sectional view showing the chassis 44 secured to the base 7. The third surface 4424 of the chassis 44 and the fourth surface 735 of the second sidewall 73 of the base 7 are configured to be at substantially the same height in the Z-direction. This allows the third surface 4424 of the chassis 44 to come into contact with the fourth surface 735 of the base 7 in substantially the same plane. Thus, in fastening of the chassis 44 to the fourth surface 735 via the hole 4426 of the chassis 44 with a fastening member such as a screw, deformation of the chassis 44 can be reduced, which enables a positioning accuracy of the upper surface portion of the chassis 44 to be maintained favorably. It goes without saying that the height of the third surface 4424 of the chassis 44 and the height of the second surface 725 of the base 7 vary within the range of component tolerance.

In this way, in the present embodiment, the chassis 44 that guides movement of the carriage 41 in the X-direction is positioned and secured to the base 7 with fastening members by engagement of the chassis 44 and the bridging member 45 that connects the upper surface of the first sidewall 72 and the upper surface of the chassis 44. Also, the chassis 44 is positioned at the base 7 at both ends in the carriage movement direction (the X-direction) by the protruding engagement portions such as bosses and the engagement holes and is secured by fastening members such as screws. The bridging member 45 too is positioned at the chassis 44 and the first sidewall 72 of the base 7 by the protruding engagement portions such as bosses and the engagement holes, and is secured by fastening members such as screws. Further, the first surface 4415 of the chassis 44 and the second surface 725 of the base 7 are at substantially the same height, and the bridging member 45 is fastened with a fastening member such as a screw.

In this way, the positioning of the chassis 44 at the base 7 is done accurately, and deformation of the chassis 44 can be reduced. Thus, the attitude of the carriage 41 during printing can be maintained at high precision favorably, which enables high quality printing on a printing medium. In other words, the costs for the apparatus can be reduced compared to those in the prior art, with the quality of images being maintained.

In this way, a printing apparatus capable of reducing degradation in image quality can be provided.

<Configuration of how the Chassis and the Bridging Member are Assembled to the Base>

Figure 12A:
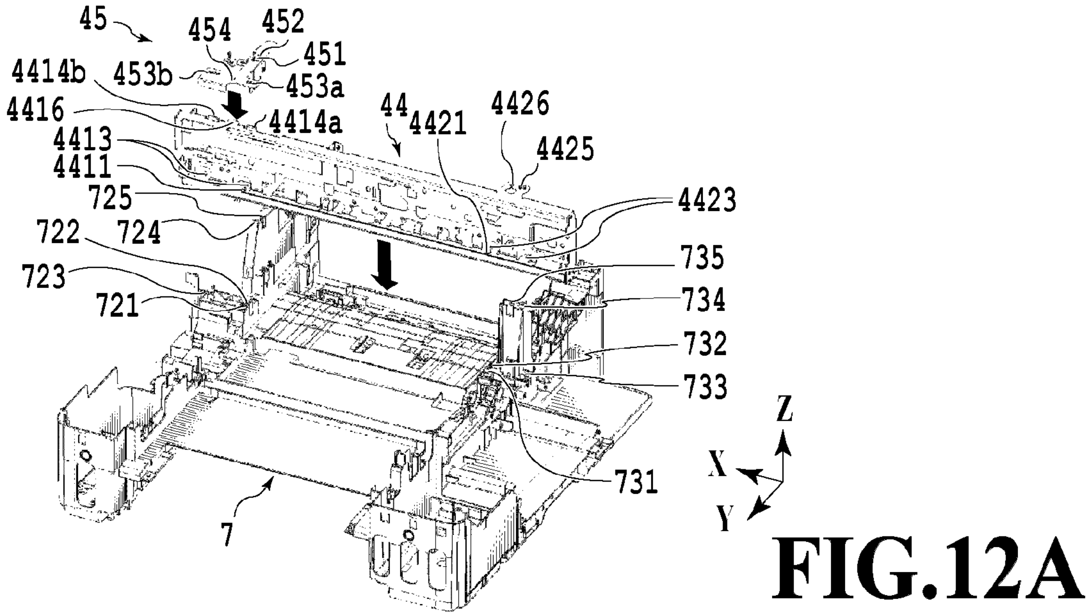
FIG. 12A is a diagram illustrating a configuration of how the chassis and the bridging member are assembled to the base.
Figure 12B:
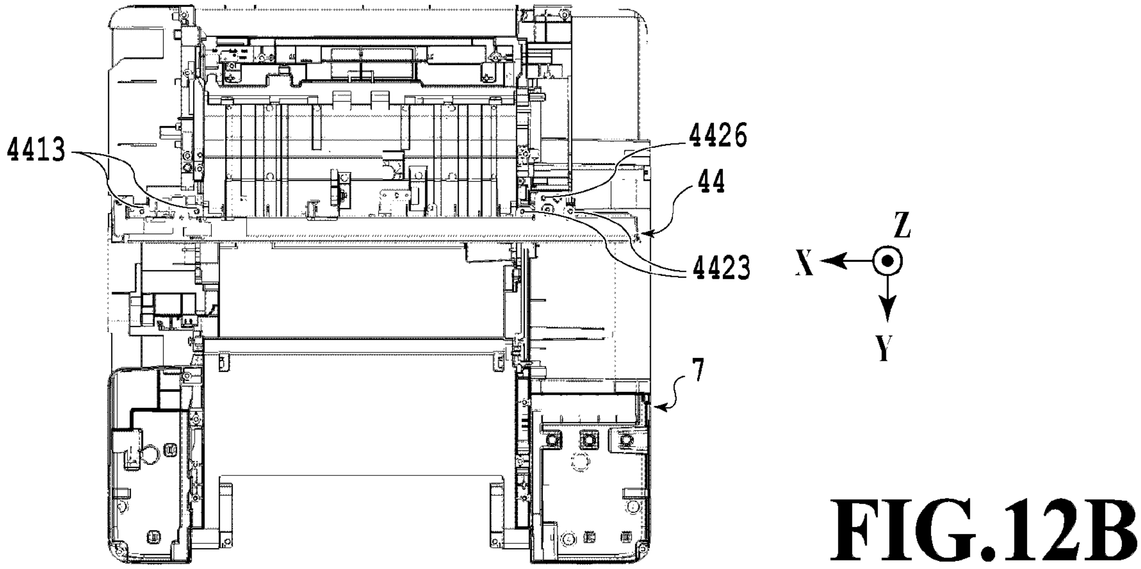
FIG. 12B is a diagram illustrating a configuration of how the chassis and the bridging member are assembled to the base.
Figure 12C:
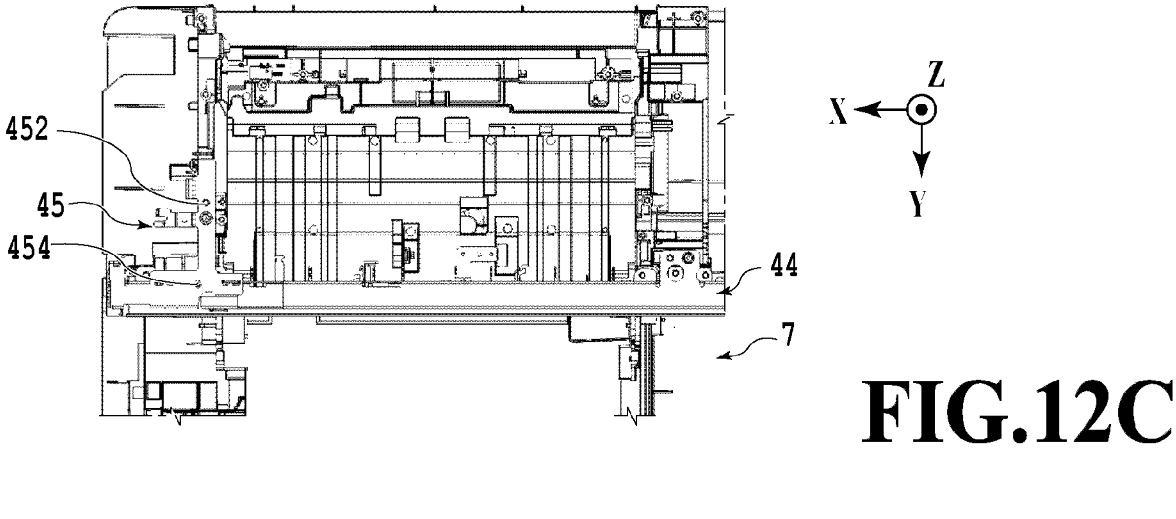
FIG. 12C is a diagram illustrating a configuration of how the chassis and the bridging member are assembled to the base.

FIGS. 12A to 12C are diagrams illustrating a configuration of how the chassis 44 and the bridging member 45 are assembled to the base 7. As shown in FIG. 12A, the engagement portions 721, 731, and 734 of the base 7 are provided protruding upward (the Z-direction) to engage with the engagement holes 4411, 4421, and 4425 of the chassis 44. Thus, the chassis 44 can be assembled to the base 7 from above downward such that the chassis 44 may come into contact with the fastening portions 722, 723, 732, 733 at the lower surface portion of the base 7 and on the fourth surface 735.

Also, as shown in FIG. 12B, the fastening portions 722, 723, 732, 733 and the fourth surface 735 of the base 7 are fastened from above to the holes 4413, 4423, and 4426 of the chassis 44 by fastening members such as screws using a screw driver. The chassis 44 is thereby positioned and secured. Because the assemblage direction and the fastening direction for the chassis 44 to the base 7 are thus the same, the assemblage process can be simplified.

Also for the bridging member 45, the engagement portions 4414*a*, 4414*b* of the chassis 44 to engage with the engagement holes 453*a*, 453*b* of the bridging member 45 and the engagement portion 724 of the base 7 to engage with the engagement hole 451 of the bridging member 45 protrude upward (the Z-direction). Thus, the bridging member can be assembled to the chassis 44 and the base 7 from above downward. Also, as shown in FIG. 12C, the bridging member 45 is positioned and secured by having its holes 452, 454 fastened from above to the base 7 and the chassis 44 with fastening members such as screws using a screw driver. Because the assemblage direction and the fastening direction for the bridging member 45 to the chassis 44 and the base 7 are thus the same, the assemblage process can be simplified.

<Configuration of how the Driving Unit is Assembled to the Base>

Figure 13A:
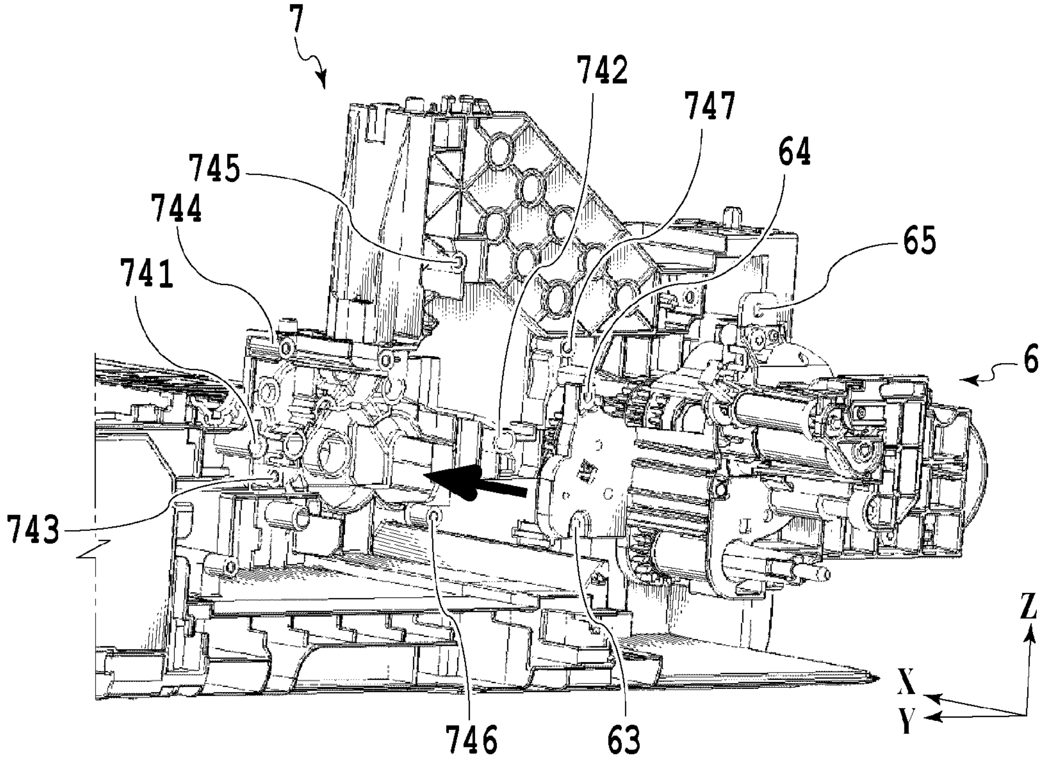
FIG. 13A is a perspective view showing a driving unit.
Figure 13B:
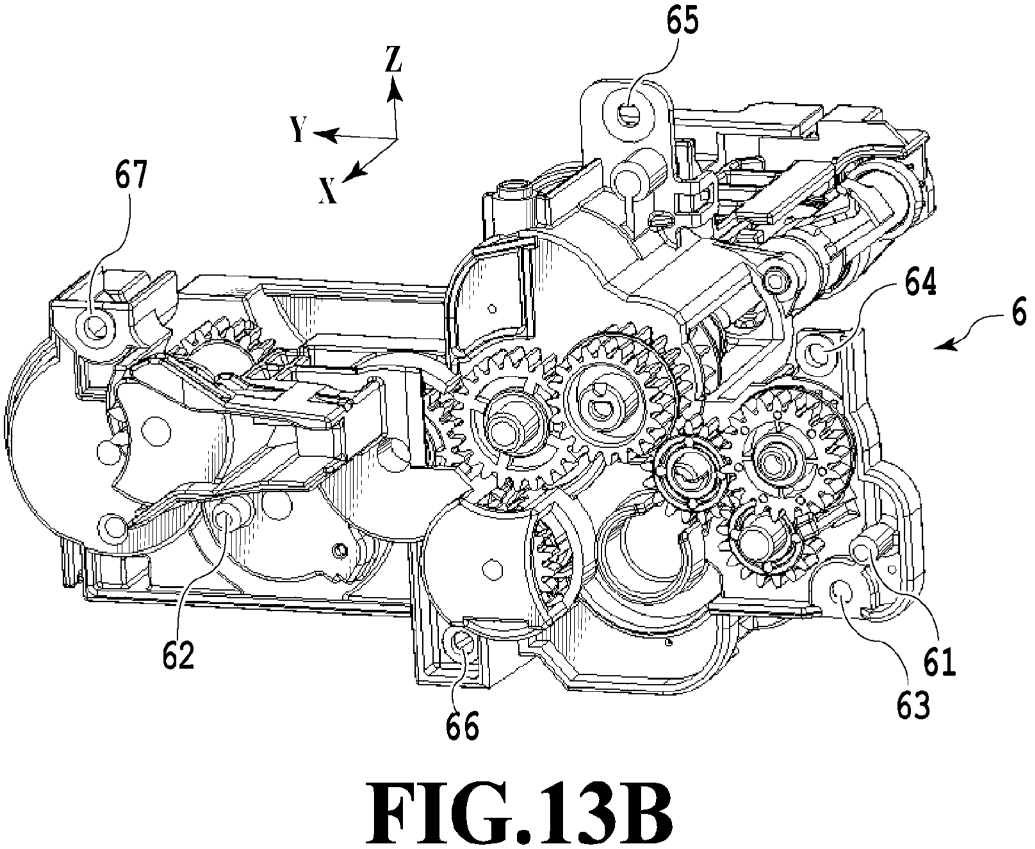
FIG. 13B is a perspective view showing the driving unit.

FIGS. 13A and 13B are perspective views showing the driving unit 6. The driving unit 6 is attached to the base 7 by bringing engagement portions 61, 62 of the driving unit 6 into engagement with engagement holes 741, 742 of the base 7. The engagement portions 61, 62 of the driving unit to engage with the engagement holes 741, 742 of the base 7 are provided protruding in the X-direction, and the driving unit 6 can be assembled to the base 7 by being moved in the X-direction and brought into engagement with the base 7.

Further, the base 7 has fastening portions 743, 744, 745, 746, 747 to fasten the driving unit 6 thereto. The driving unit 6 is positioned and secured by having its holes 63, 64, 65, 66, 67 fastened in the X-direction to the fastening portions 743, 744, 745, 746, 747 of the base 7 with fastening members such as screws using a screw driver. Because the assemblage direction and the fastening direction for the driving unit 6 to the base 7 are thus the same, the assemblage process can be simplified.

<Configuration of how the First Sheet Feed Unit is Assembled to the Base>

Figure 14A:
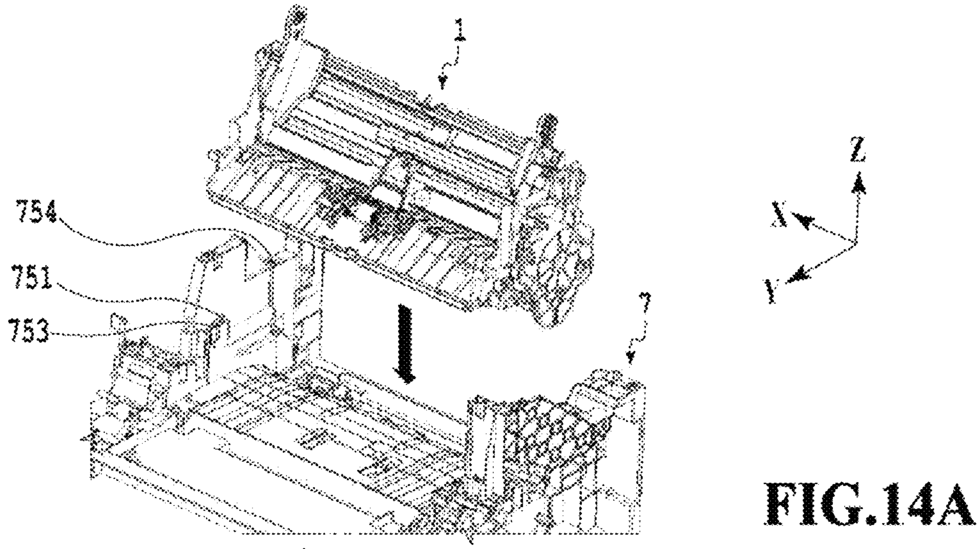
FIG. 14A is a diagram showing a configuration of how a first sheet feed unit is assembled to the base.
Figure 14B:
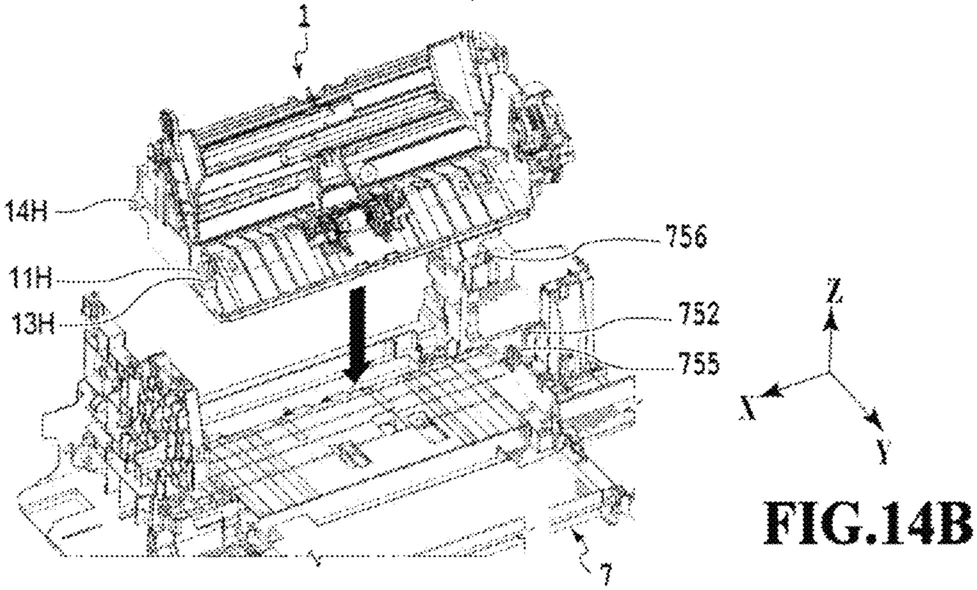
FIG. 14B is a diagram showing a configuration of how the first sheet feed unit is assembled to the base.
Figure 14C:
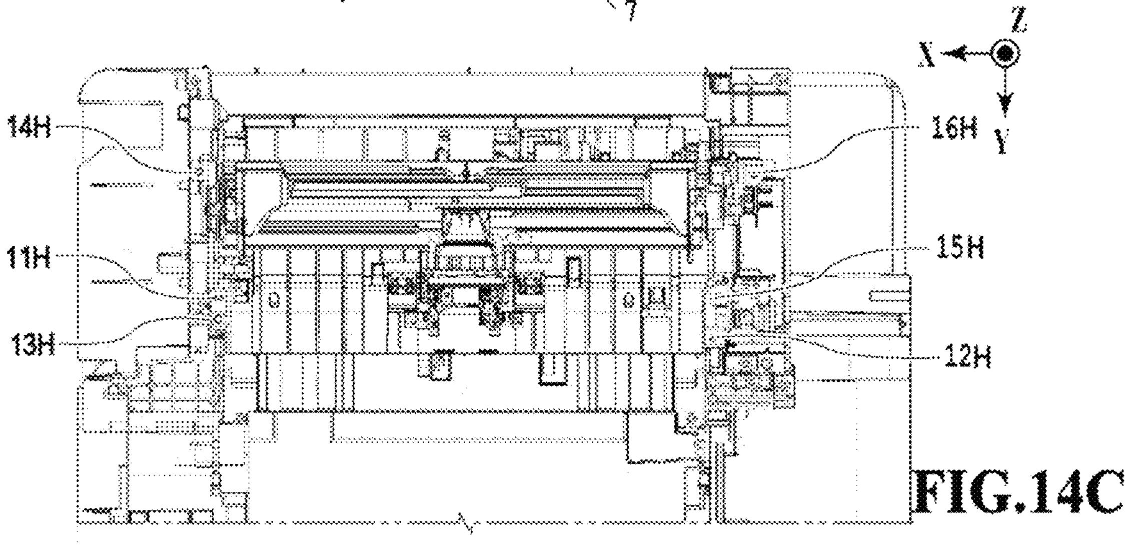
FIG. 14C is a diagram showing a configuration of how the first sheet feed unit is assembled to the base.

FIGS. 14A to 14C are diagrams showing a configuration of how the first sheet feed unit 1 is assembled to the base 7. The first sheet feed unit 1 is attached to the base 7 by bringing engagement holes 11H, 12H of the first sheet feed unit 1 into engagement with engagement portions 751, 752 of the base 7. The engagement portions 751, 752 of the base 7 are provided protruding in the Z-direction, and the first sheet feed unit 1 can be assembled to the base 7 from above downward. The base 7 further has fastening portions 753, 754, 755, 756 to allow the first sheet feed unit 1 to be fastened thereto. The first sheet feed unit 1 is positioned and secured by having its holes 13H, 14H, 15H, 16H fastened to the base 7 from above in the Z-direction with fastening members such as screws using a screw driver. Because the assemblage direction and the fastening direction for the first sheet feed unit 1 to the base 7 are thus the same, the assemblage process can be simplified.

<Configuration of how the Maintenance Unit is Assembled to the Base>

Figure 15A:
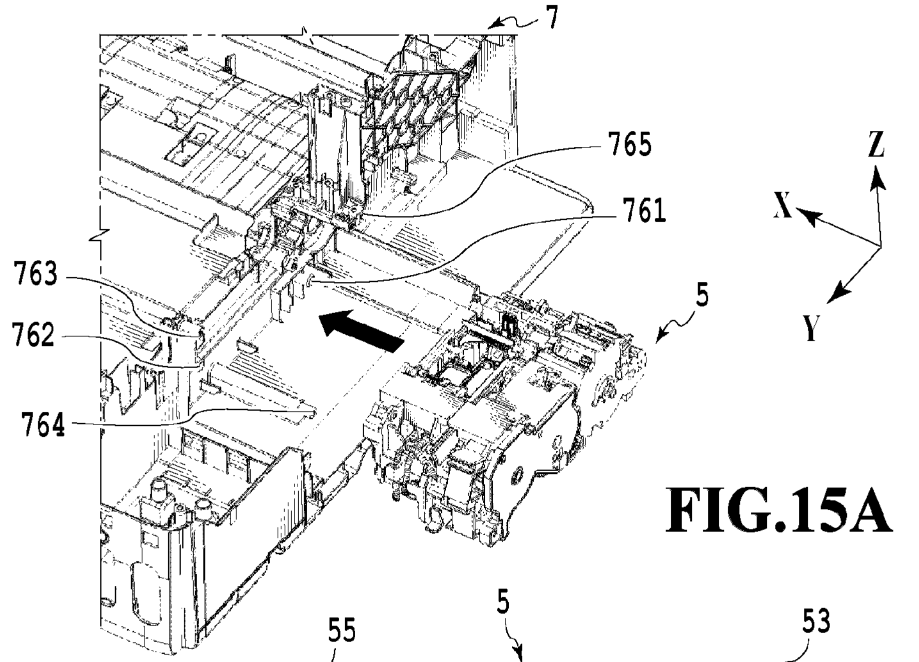
FIG. 15A is a diagram showing a configuration of how a maintenance unit is assembled to the base.
Figure 15B:
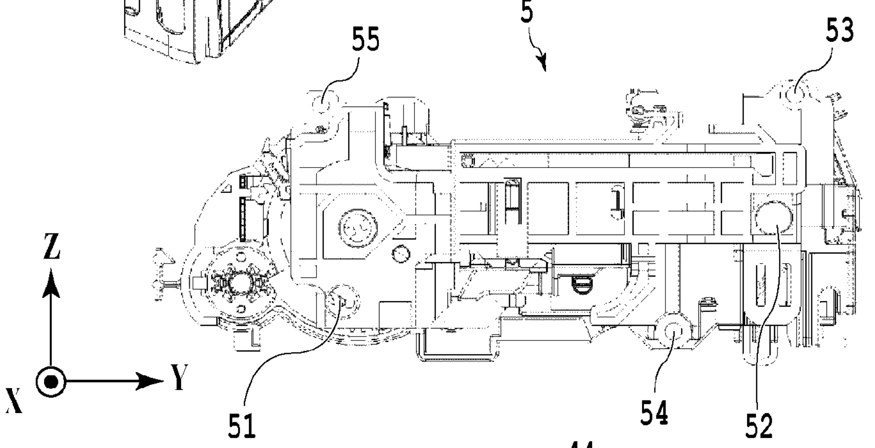
FIG. 15B is a diagram showing a configuration of how the maintenance unit is assembled to the base.
Figure 15C:
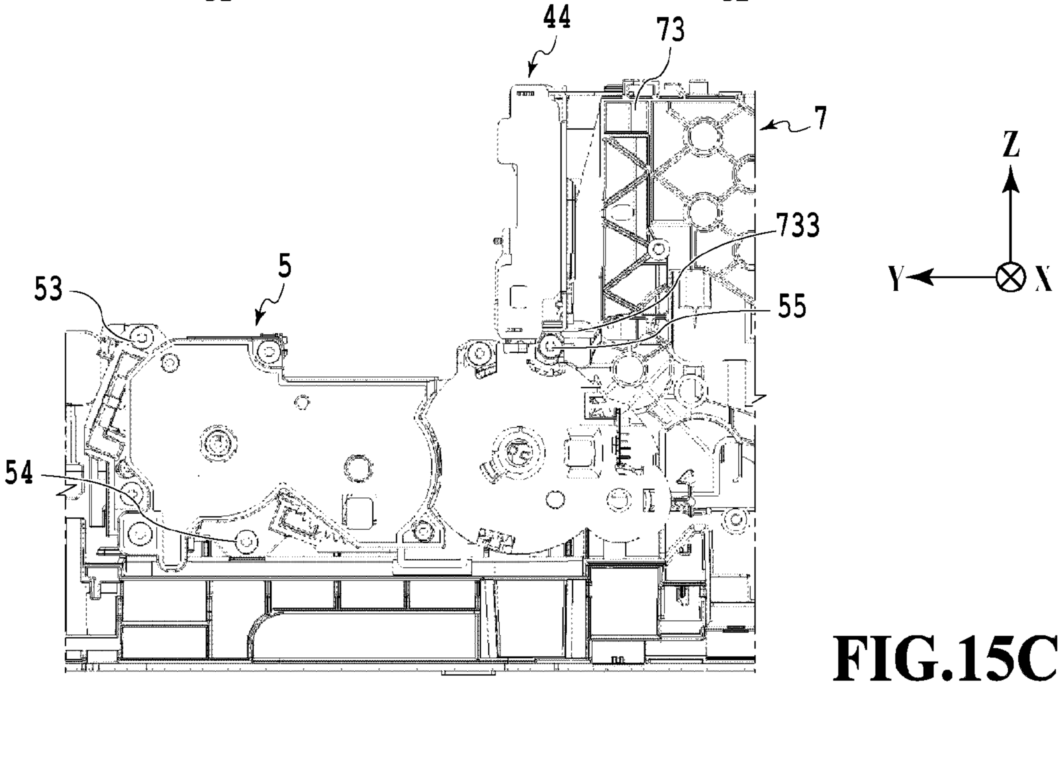
FIG. 15C is a diagram showing a configuration of how the maintenance unit is assembled to the base.

FIGS. 15A to 15C are diagrams showing a configuration of how the maintenance unit 5 is assembled to the base 7. The maintenance unit 5 is attached to the base 7 by bringing the engagement holes 51, 52 of the maintenance unit 5 into engagement with engagement portions 761, 762 of the base 7. The engagement portions 761, 762 of the base 7 are provided protruding in the –X-direction, and the maintenance unit 5 can be assembled to the base 7 by being moved in the X-direction and brought into engagement with the base 7. The base 7 further has fastening portions 763, 764, 765 to allow the maintenance unit 5 to be fastened thereto. The maintenance unit 5 is positioned and secured by having its hole portions 53, 54, 55 fastened to the base 7 from the X-direction with fastening members such as screws using a screw driver. Because the assemblage direction and the fastening direction for the maintenance unit 5 to the base 7 are thus the same, the assemblage process can be simplified.

Also, as shown in FIG. 15C, the hole portion 55 located at the maintenance unit 5 on the upstream side in the Y-direction is fastened to a position near the fastening portion 733 which is fastened to the bottom surface of the chassis 44 at the lower surface portion of the second sidewall 73 of the base 7. Thus, in a case where the base 7 deforms by receiving a load applied from, e.g., the pinch roller (not shown) of the conveyance unit 3, the maintenance unit 5 can maintain a favorable positional relation with the chassis 44 because the maintenance unit 5 is positioned and secured to the base 7 in such a manner as to conform to deformation of the chassis 44.

<Configuration of how a Driving Force Transmission Unit at the Conveyance Unit is Assembled>

Figure 16:
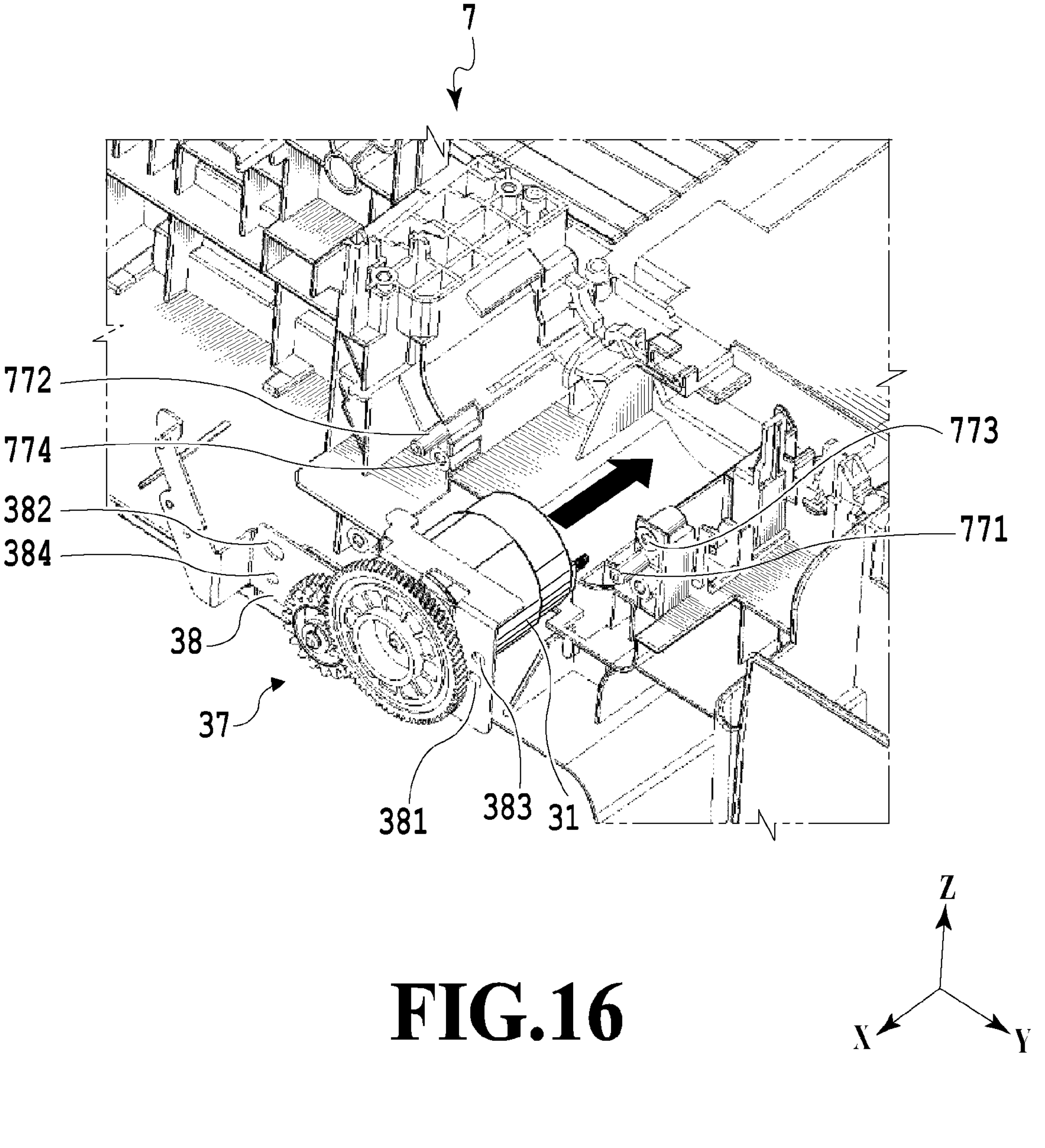
FIG. 16 is a perspective view showing an assemblage configuration of a driving force transmission unit at a conveyance unit.

FIG. 16 is a perspective view showing a configuration of how a driving force transmission unit at the conveyance unit is assembled. In a driving force transmission unit 37, driving members such as gears including the conveyance motor 31 as a driving source are held on sheet metal 38, and the sheet metal 38 is attached to the base 7. The sheet metal 38 is attached to the base 7 by bringing engagement holes 381, 382 of the sheet metal 38 into engagement with engagement portions 771, 772 of the base 7. The engagement portions 771, 772 of the base 7 protrude in the X-direction, and the driving force transmission unit 37 can be attached to the base 7 by being moved in the –X-direction and brought into engagement with the base 7. Because the assemblage direction and the fastening direction for the driving force transmission unit 37 to the base 7 are thus the same, the assemblage process can be simplified. (Sheet metal 38 also includes portions 383 and 384, and base 7 also includes portions 773 and 774.

<Configuration of how the Chassis, the Circuit Board, and the Guide are Positioned and Held at the Base>

Figure 17:
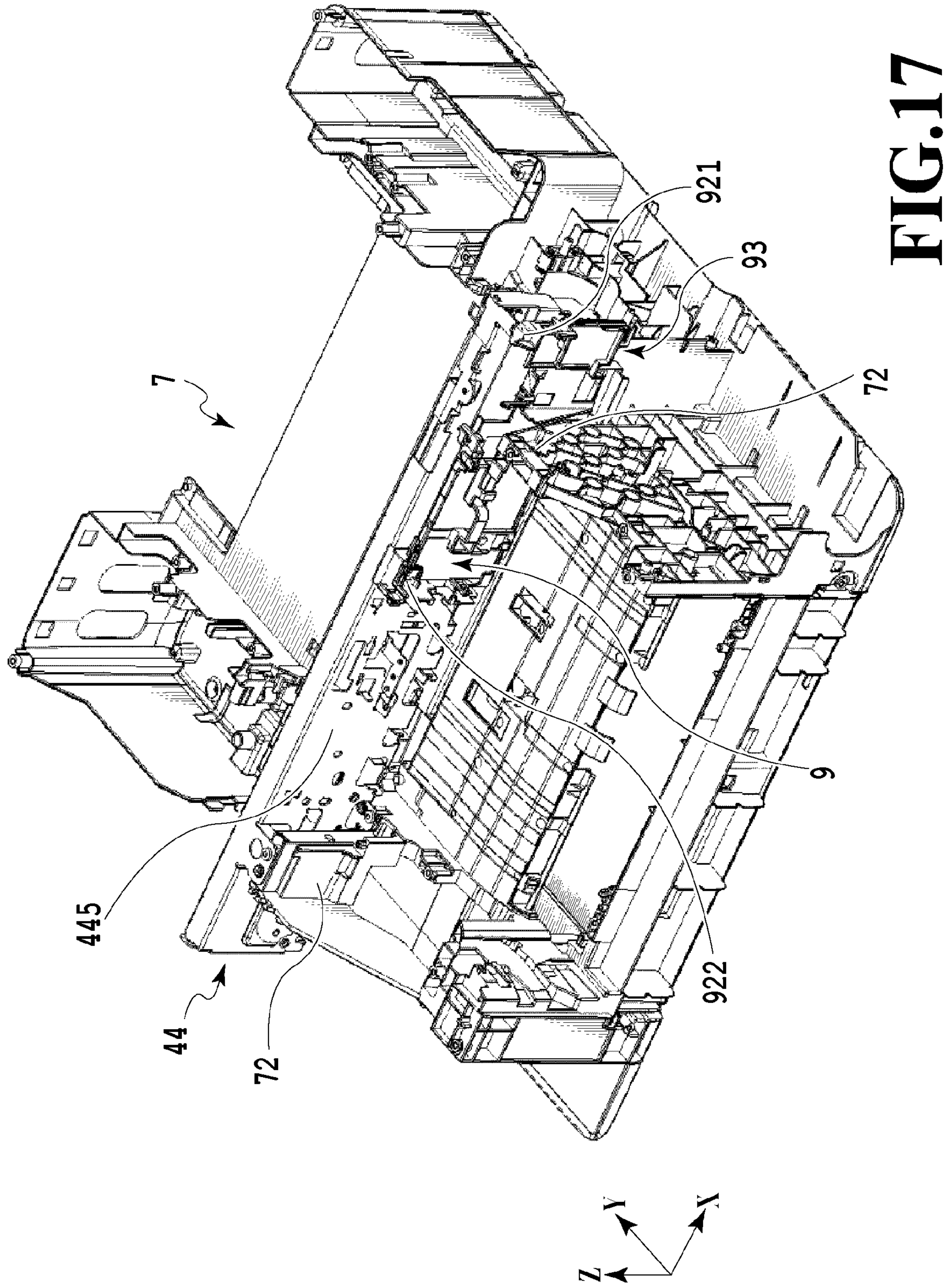
FIG. 17 is a perspective view showing the base at which a circuit board is positioned and held.

FIG. 17 is a perspective view showing the base 7 at which the chassis 44 and the circuit board 9 held by the guide 93 are positioned and held. The circuit board 9 is held under the bridging member 45 by the guide 93, engages with the base 7 and the chassis 44, and is positioned and secured to the chassis 44 by fastening members such as screws. In order to describe a configuration of how the chassis 44 and the circuit board 9 held by the guide 93 are positioned and held at the base 7, a detailed description is given below of the following: a part of the base 7 related to holding of the circuit board 9, a part of the chassis 44 related to holding of the circuit board 9, the circuit board 9, and the guide 93.

Figure 18:
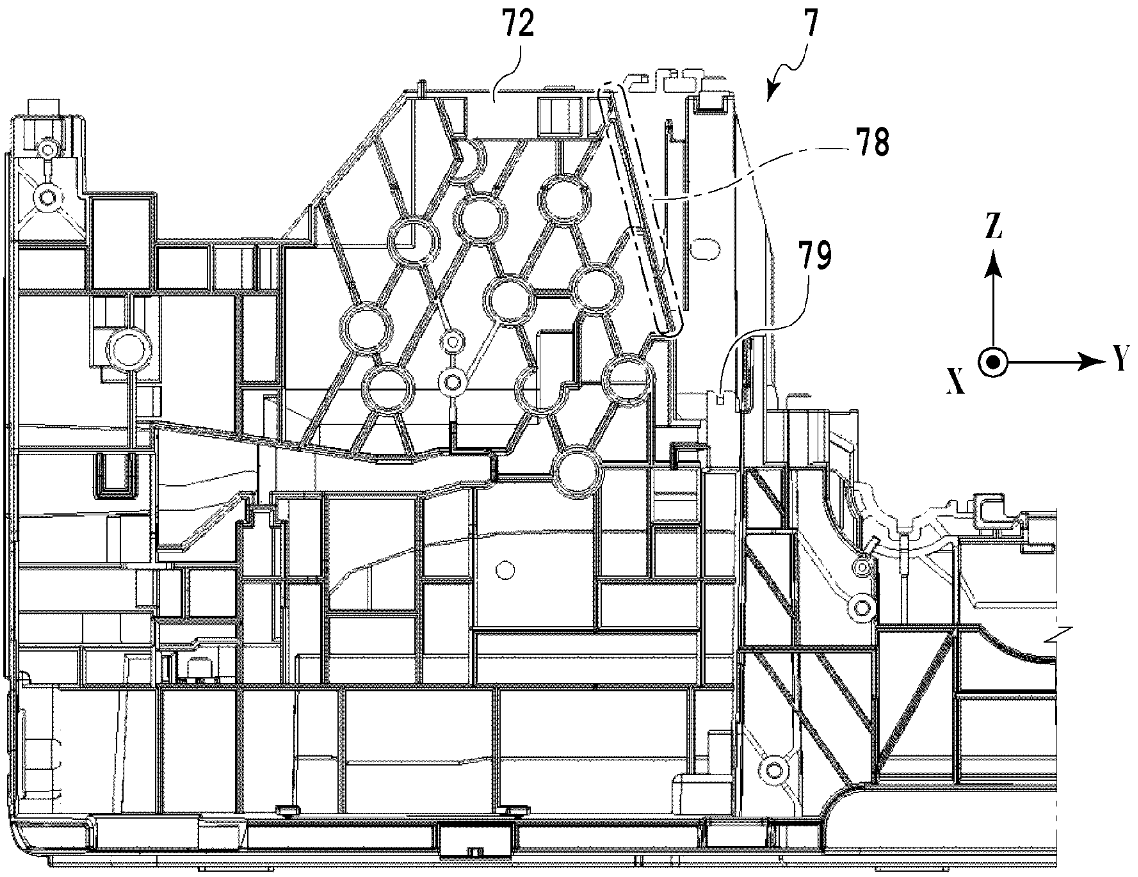
FIG. 18 is a side view showing the base.

FIG. 18 is a side view showing the base 7. A slope shape portion 78 is provided at the first sidewall 72 of the base 7 to restrict the position of the guide 93 during assemblage of the guide 93 holding the circuit board 9 to the base 7 and the chassis 44. In addition, a substantially letter-U-shaped first positioning shape portion 79 is provided to determine the position of the circuit board 9.

Figure 19A:
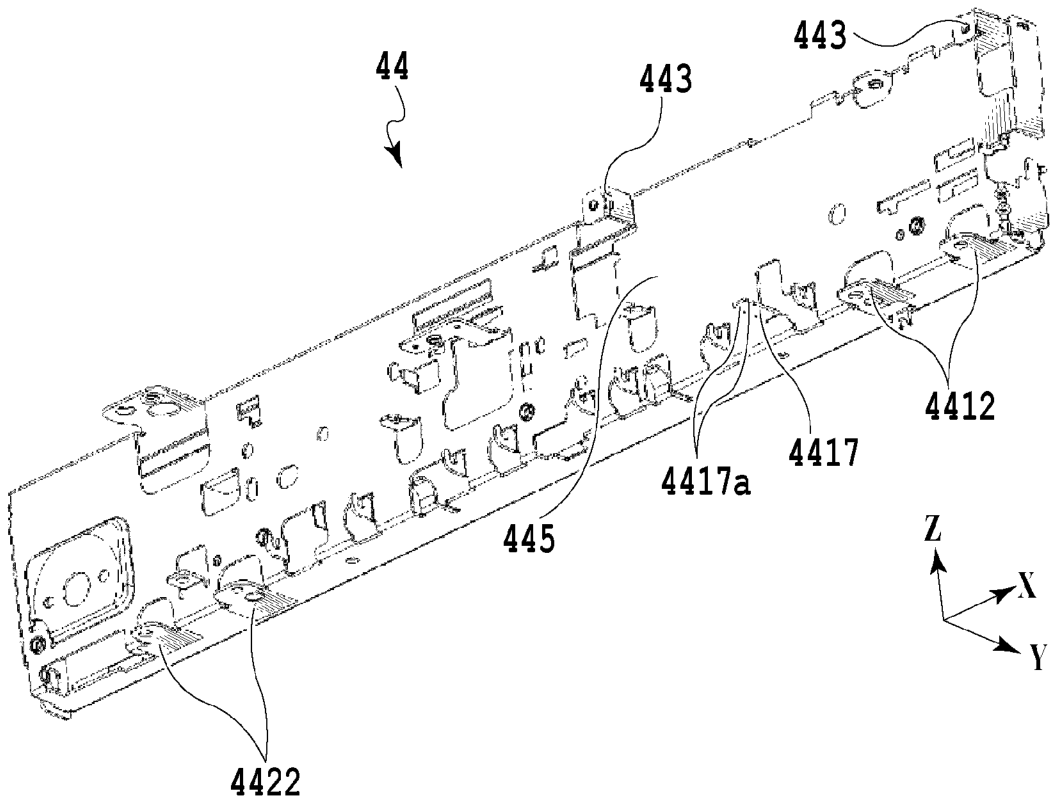
FIG. 19A is a diagram showing the chassis.
Figure 19B:
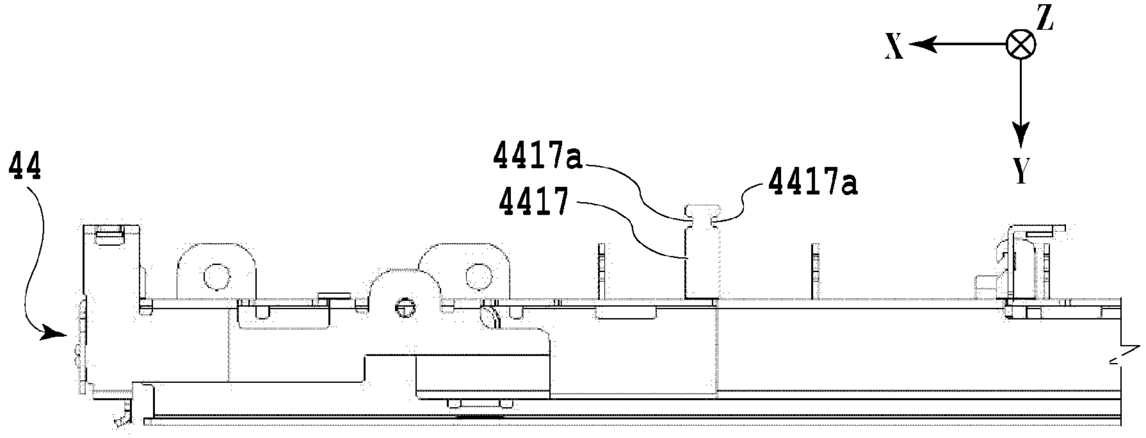
FIG. 19B is a diagram showing the chassis.

FIGS. 19A and 19B are diagrams showing the chassis 44. A rear surface portion 445 of the chassis 44 is formed perpendicularly to the bottom surface of the chassis 44, and a hole 443 for fastening of the circuit board 9 with a fastening member such as a screw is provided by lancing at the rear surface portion 445. Further, a second positioning shape portion 4417 is provided at the lower side of the rear surface portion 445 of the chassis 44 to determine the position of the circuit board 9. FIG. 19B is a top view of the chassis 44, showing the second positioning shape portion 4417 in detail. As shown in FIG. 19B, in a top view of the chassis 44, the second positioning shape portion 4417 has recess-shaped portions 4417*a* to determine the position of the circuit board 9.

Figure 20:
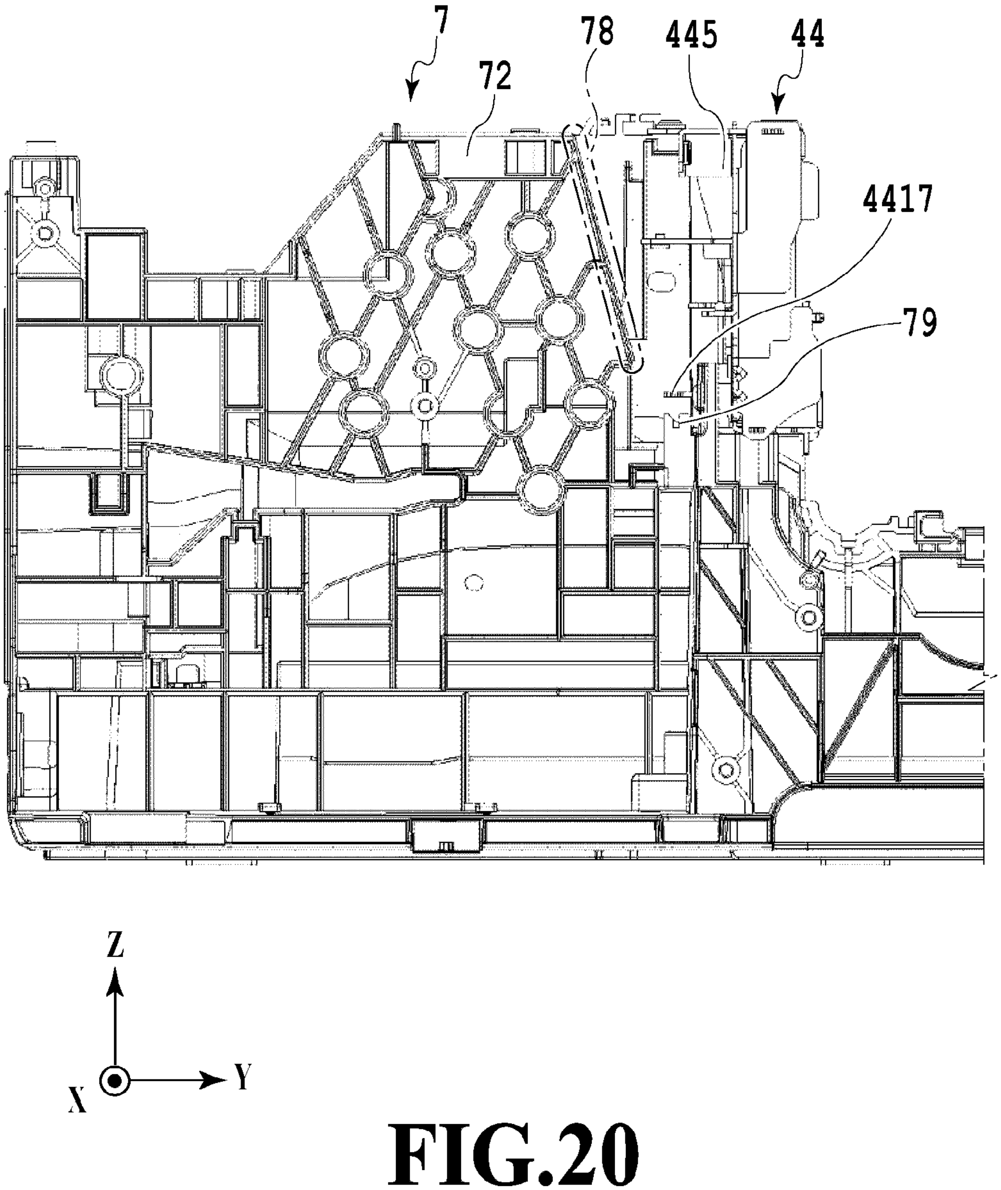
FIG. 20 is a side view showing the base at which the chassis is positioned and secured.

FIG. 20 is a side view showing the base 7 at which the chassis 44 is positioned and secured. The slope shape portion 78 provided at the first sidewall 72 of the base 7 is formed at an angle such that the distance between the base 7 and the rear surface portion 445 of the chassis 44, which is perpendicularly provided, increases more and more toward the Z-direction.

Figure 21A:
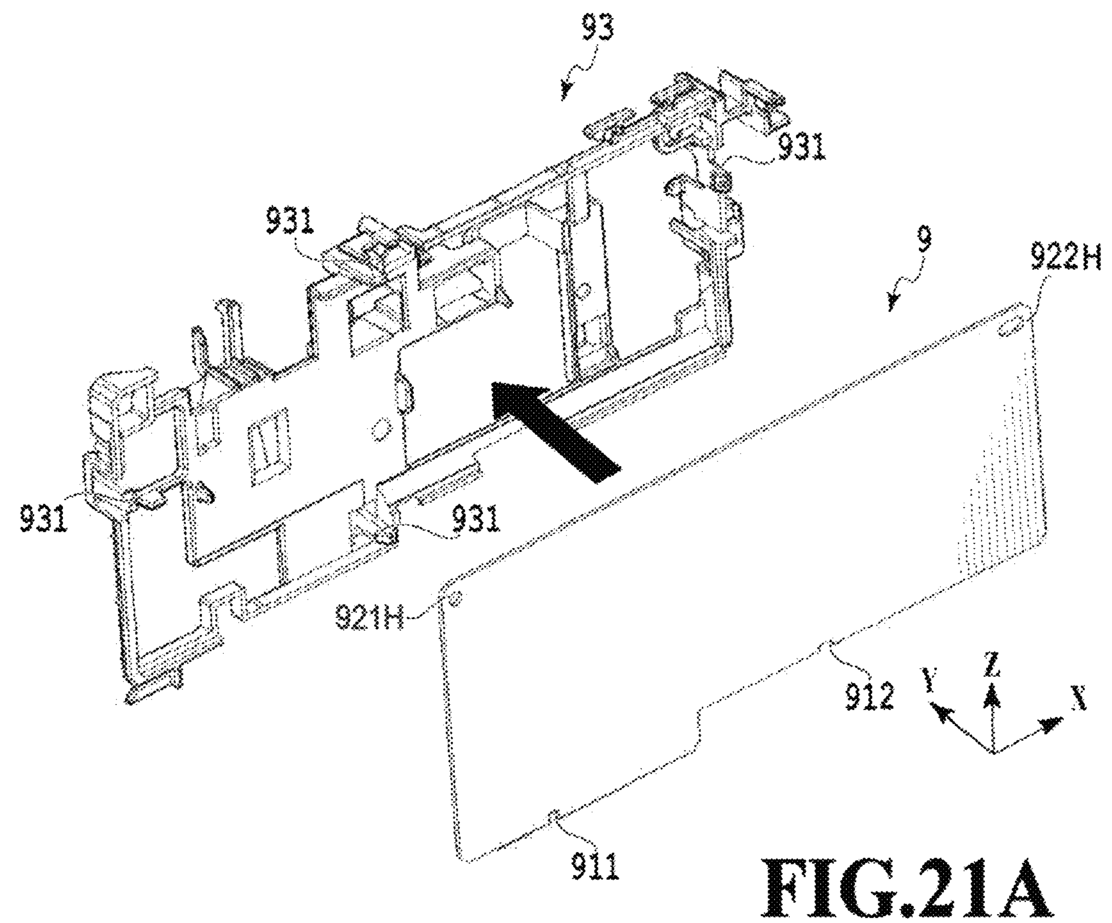
FIG. 21A is a perspective view showing a guide and the circuit board.
Figure 21B:
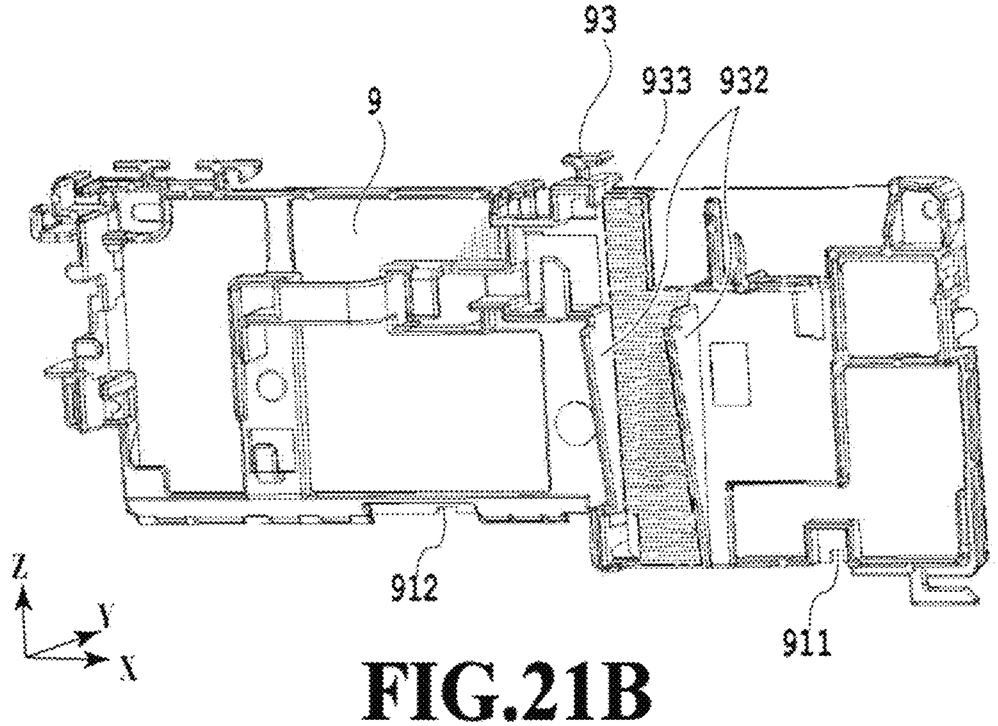
FIG. 21B is a perspective view showing the guide and the circuit board.

FIGS. 21A and 21B are perspective views showing the guide 93 and the circuit board 9. The circuit board 9 includes holes 921H, 922H for fastening to the chassis 44 with fastening members such as screws. The circuit board 9 is further provided with a notch portion 911 to engage with the first positioning shape portion 79 of the base 7 and a notch portion 912 to engage with the second positioning shape portion 4417 of the chassis 44.

The guide 93 is provided with four claw portions 931 for holding the circuit board 9. The circuit board 9 is held by the guide 93 with these claw portions 931 of the guide 93. Two ribs are arranged side by side in the X-direction at the rear surface of the guide 93 as restriction shape portions 932 to restrict the position of the slope shape portion 78 of the base 7 in the width direction. Also, the rear surface of the guide 93 is provided with a slide surface 933 which slides against the slope shape portion 78 of the base 7 in assemblage of the guide 93 into the base 7 and the chassis 44.

Figure 22A:
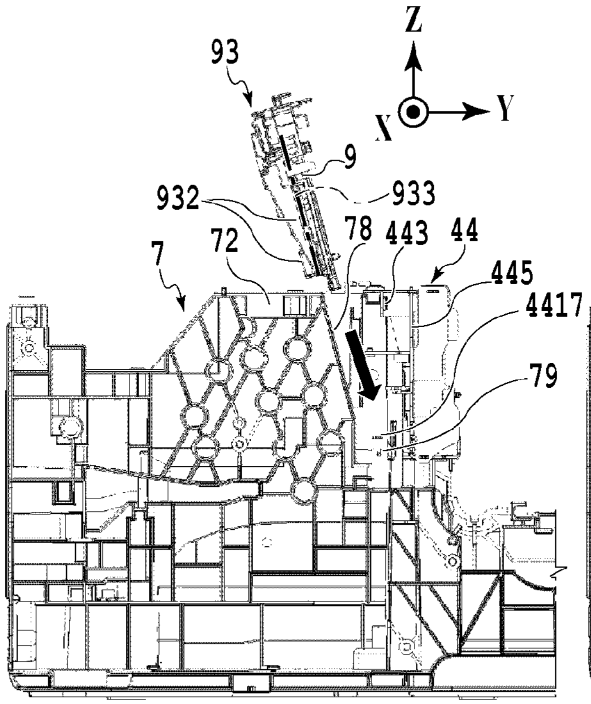
FIG. 22A is a diagram showing, in the order of operation, how the guide is assembled into the base and the chassis.
Figure 22B:
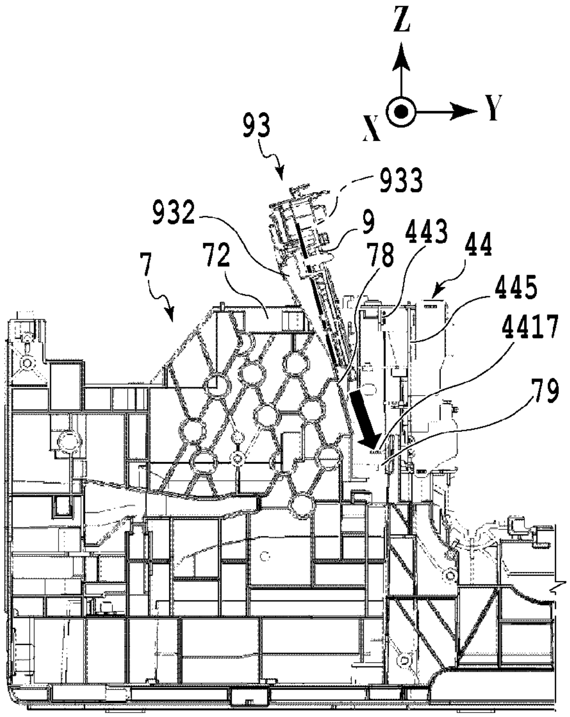
FIG. 22B is a diagram showing, in the order of operation, how the guide is assembled into the base and the chassis.
Figure 22C:
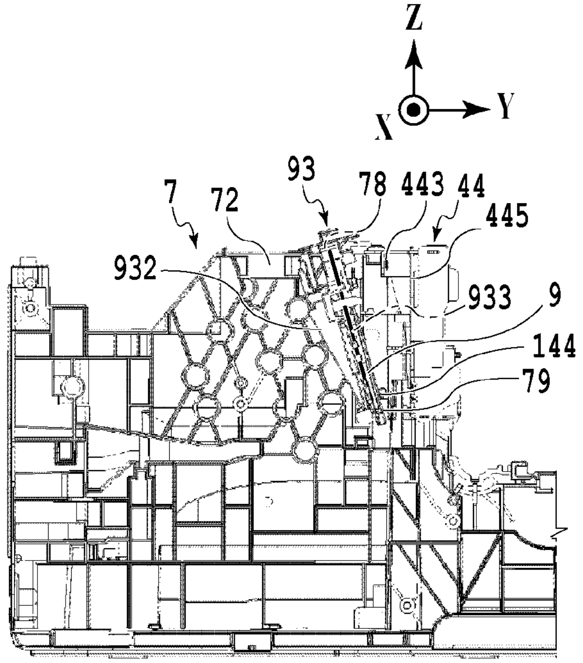
FIG. 22C is a diagram showing, in the order of operation, how the guide is assembled into the base and the chassis.
Figure 22D:
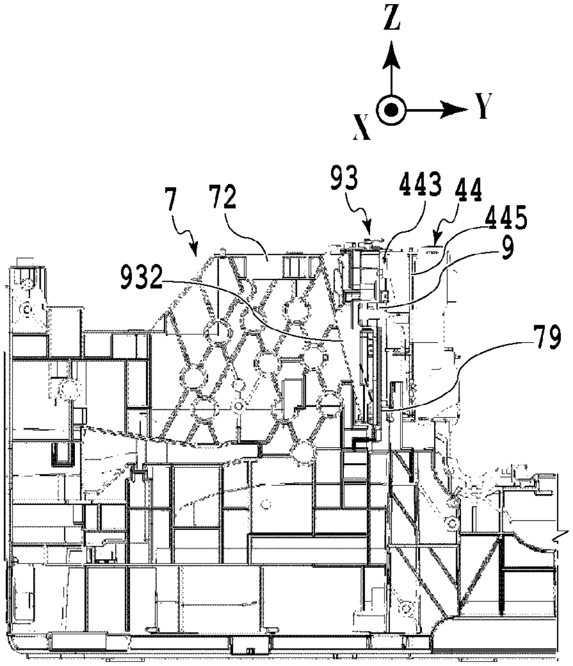
FIG. 22D is a diagram showing, in the order of operation, how the guide is assembled into the base and the chassis.

FIGS. 22A to 22D are side views showing, in the order of operation, how the guide 93 holding the circuit board 9 is assembled into the base 7 and the chassis 44. As shown in FIG. 22A, the circuit board 9 holding the guide 93 is assembled into the base 7 and the chassis 44 from above in the Z-direction so that the slide surface 933 of the guide 93 and the slope shape portion 78 of the base 7 may be parallel to each other. After that, as shown in FIG. 22B, the circuit board 9 and the guide 93 are assembled into the base 7 and the chassis 44 with the slide surface 933 of the guide 93 sliding against the slope shape portion 78 of the base 7, and as shown in FIG. 22C, the circuit board 9 held by the guide 93 is assembled into the lower surface portion of the base 7. The assemblage of the guide 93 holding the circuit board 9 into the base 7 is accomplished with its position in the width direction restricted by the slope shape portion 78 of the base 7 and the two ribs arranged in the X-direction, which are the restriction shape portions 932 of the guide 93. Then, as shown in FIG. 22D, the guide 93 holding the circuit board 9 is assembled into the base 7.

Figure 23A:
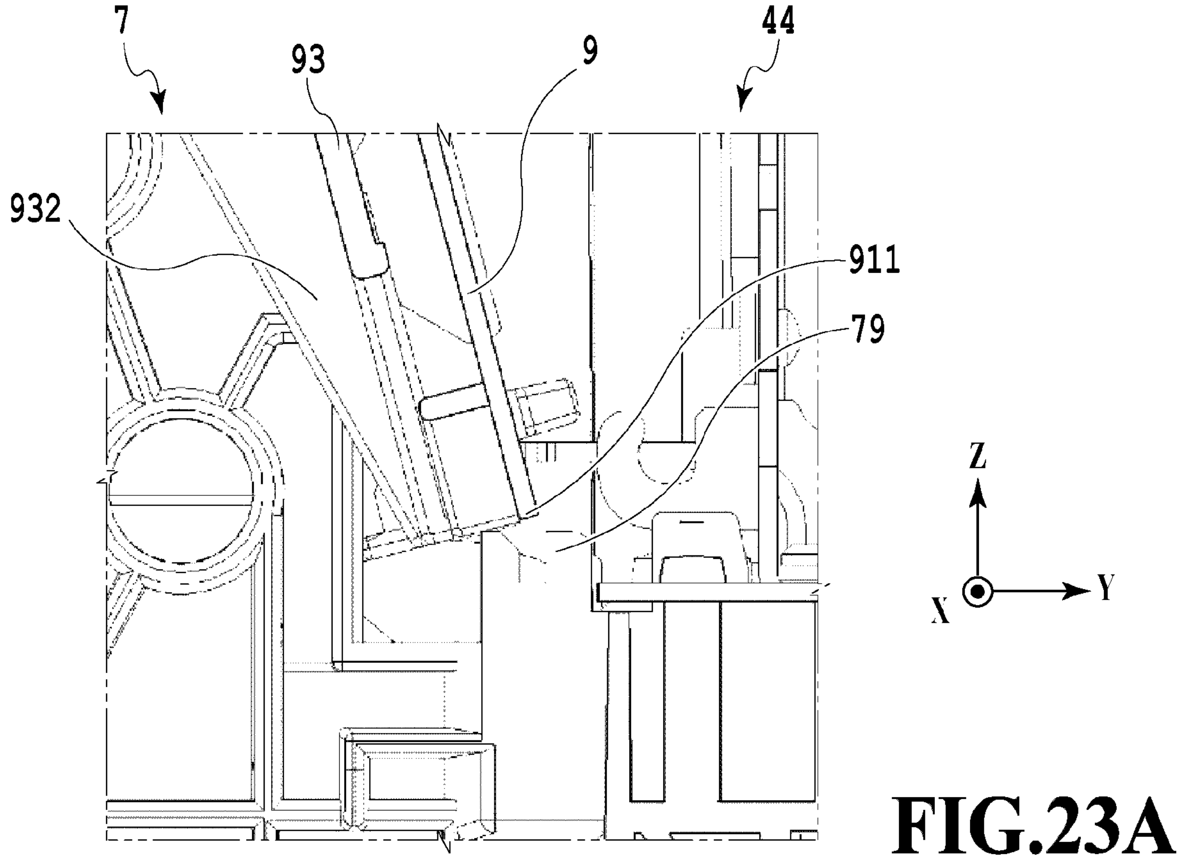
FIG. 23A is a partially enlarged view showing a notch portion of the guide assembled into the base.
Figure 23B:
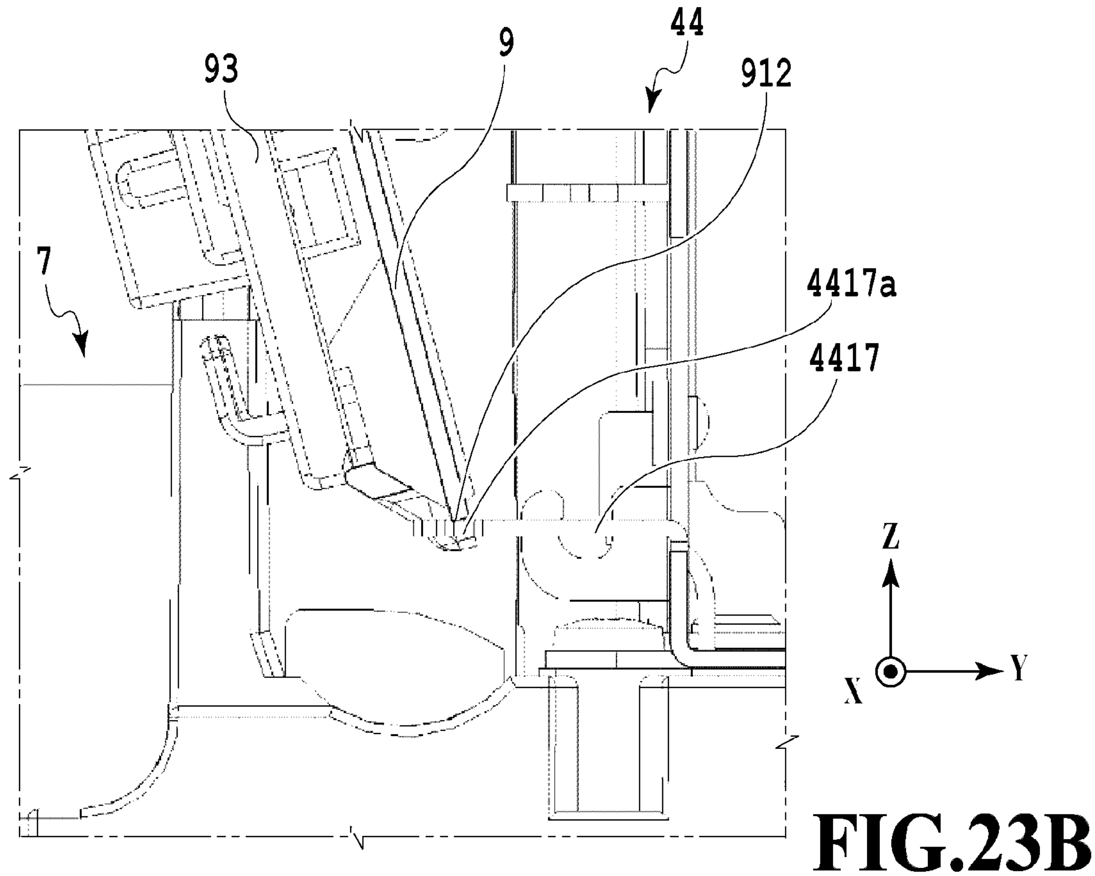
FIG. 23B is a partially enlarged view showing a notch portion of the guide assembled into the base.

FIGS. 23A and 23B are partially-enlarged diagrams showing the notch portions 911, 912 of the circuit board 9 held by the guide 93, assembled into the base 7. FIG. 23A shows a state immediately before the first positioning shape portion 79 of the base 7 engages with the notch portion 911 of the circuit board 9. Abutment between the slope shape portion 78 of the base 7 and the slide surface 933 of the guide 93 causes the notch portion 911 of the circuit board 9 held by the guide 93 to be guided into and brought into engagement with the letter-U-shaped groove, which is the first positioning shape portion 79 of the base 7.

FIG. 23B shows a state immediately before the second positioning shape portion 4417 of the chassis 44 engages with the notch portion 912 of the circuit board 9. The notch portion 912 of the circuit board 9 is guided into and brought into engagement with the recess-shaped portions 4417*a* of the second positioning shape portion 4417 of the chassis 44. After the notch portions 911, 912 of the circuit board 9 engage with the base 7 and the chassis 44, respectively, as shown in FIG. 22D, the circuit board 9 is set up in such a manner as to be parallel to the rear surface portion 445 of the chassis 44. Then, the circuit board 9 is positioned and secured to the hole 443 of the chassis 44 with a fastening member such as a screw.

In this way, the slope shape portion 78 of the base 7 is formed at an angle such that the distance between the base 7 and the rear surface portion 445 of the chassis 44 increases toward the Z-direction. Then, the guide 93 holding the circuit board 9 is assembled into the base 7 with the slide surface 933 of the guide 93 holding the circuit board 9 sliding against the slope shape portion 78 of the base 7. This allows a contact between the chassis 44 and the circuit board 9 to be reduced. Further, the restriction shape portions 932 of the guide 93 and the slope shape portion 78 of the base 7 enable the circuit board 9 held by the guide 93 to be assembled while being restricted in the X-direction. Thus, the notch portions 911, 912 of the circuit board 9 can be easily guided to and brought into engagement with the first positioning shape portion 79 of the base 7 and the second positioning shape portion 4417 of the chassis 44. Also, the provision of the first positioning shape portion 79 at the base 7 and the provision of the second positioning shape portion 4417 at the chassis 44 allow the circuit board 9 to be supported widely in the X-direction, which enables the circuit board 9 to be positioned and secured to the chassis 44 with a stable attitude.

<Configuration of how a WLAN Board and an Electronic Device are Positioned and Secured to the Bridging Member>

Figure 24A:
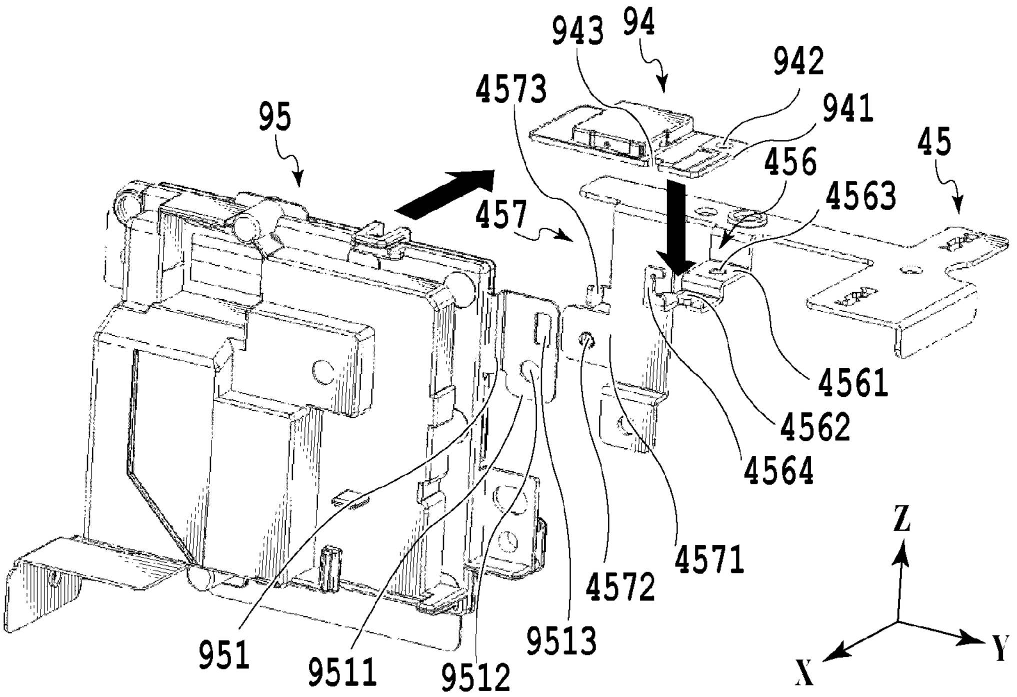
FIG. 24A is a perspective view showing the bridging member, a WLAN board, and an electronic device.
Figure 24B:
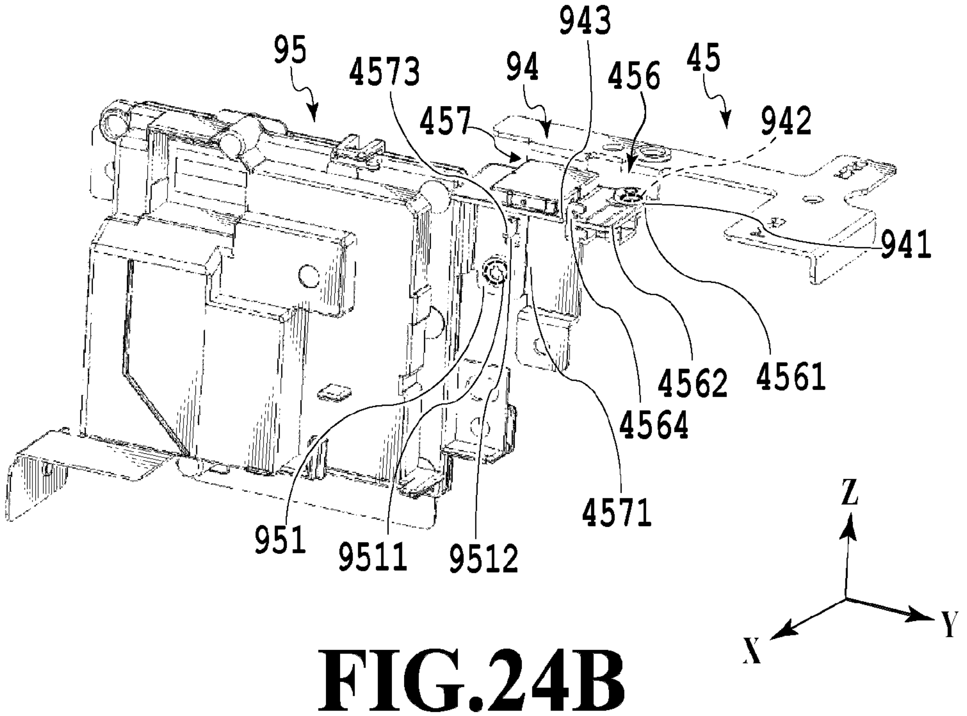
FIG. 24B is a perspective view showing the bridging member, the WLAN board, and the electronic device.

FIG. 24A is a perspective view showing a configuration of how a WLAN board 94 and an electronic device 95 are assembled to the bridging member 45. FIG. 24B is a perspective view showing a state where the WLAN board 94 and the electronic device 95 are positioned and held at the bridging member 45. The bridging member 45 has two fastening portions 456, 457 formed extending downward (the −Z-direction) at the upstream side and the downstream side in the Y-direction by lancing of sheet metal.

At a board portion 941 of the WLAN board 94, a hole 942 for fastening to the fastening portion 456 of the bridging member 45 and a notch portion 943 are provided. At the fastening portion 456 of the bridging member 45, contact surfaces 4561 and 4562 with which the board portion 941 of the WLAN board 94 is to come into contact are formed by lancing of sheet metal. Also, the contact surface 4561 is provided with a fastening hole 4563 for fastening to the hole 942 of the WLAN board 94 with a fastening member such as a screw. Further, at the fastening portion 456, a hook shape portion 4564 to engage with the notch portion 943 of the WLAN board 94 is formed by lancing of sheet metal.

The WLAN board 94 is assembled into the bridging member 45 from above downward in the Z-direction. Then, as shown in FIG. 24B, the notch portion 943 of the WLAN board 94 engages with the hook shape portion 4564 of the fastening portion 456 of the bridging member 45, restricting the position of the WLAN board 94 in the Y- and Z-directions. Further, the bottom surface of the board portion 941 of the WLAN board 94 is in contact with the contact surfaces 4561 and 4562 of the bridging member 45, and the WLAN board 94 is positioned and secured to the fastening portion 456 with a fastening member such as a screw.

Although what is attached to the fastening portion 456 of the bridging member 45 is the WLAN board 94 in the present embodiment, it is to be noted that a different electric board may be attached instead.

As shown in FIG. 24A, the fastening portion 457 of the bridging member 45 located at the upstream side of the Y-direction has a contact surface 4571 with which the electronic device 95 is to come into contact. A fastening hole 4572 for fastening with a fastening member such as a screw is provided at the contact surface 4571, and also, a substantially letter-L-shaped hook shape portion 4573 is formed at the contact surface 4571 by lancing of sheet metal. The electronic device 95 holds sheet metal 951 which is provided with a surface 9511 to come into contact with the contact surface 4571 of the fastening portion 457 and a hole 9512 for fastening to the fastening hole 4572 of the fastening portion 457. The sheet metal 951 is further provided with a hole 9513 into which the hook shape portion 4573 of the fastening portion 457 is to be hooked.

The electronic device 95 is assembled into the bridging member 45 from the −X-direction. As shown in FIG. 24B, the hook shape portion 4573 of the bridging member 45 is hooked into the hole 9513 in the sheet metal 951 of the electronic device 95, and the surface 9511 comes into contact with the contact surface 4571 of the fastening portion 457 of the bridging member 45. Then, the electronic device 95 is positioned and secured to the fastening portion 457 of the bridging member 45 with a fastening member such as a screw. In the manner described above, the bridging member 45 can hold the WLAN board 94 and the electronic device 95.

<Positional Relation Between Surfaces at the Base's Bottom Surface to which Rubber Members are Attached and Pivotal Support Surfaces that Pivotally Support the Conveyance Roller>

Figure 25A:
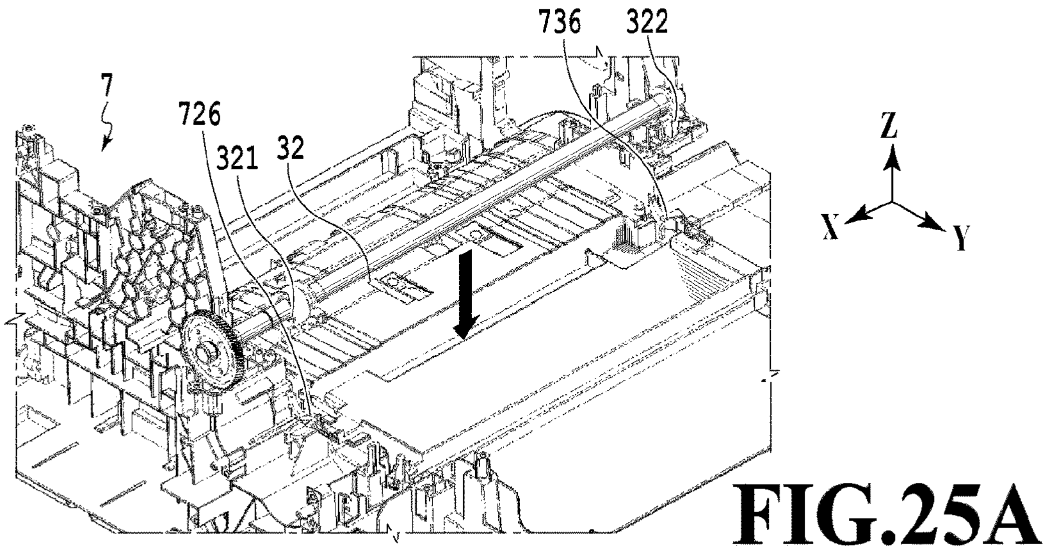
FIG. 25A is a perspective view showing pivotal support surfaces of a conveyance roller of the conveyance unit.
Figure 25B:
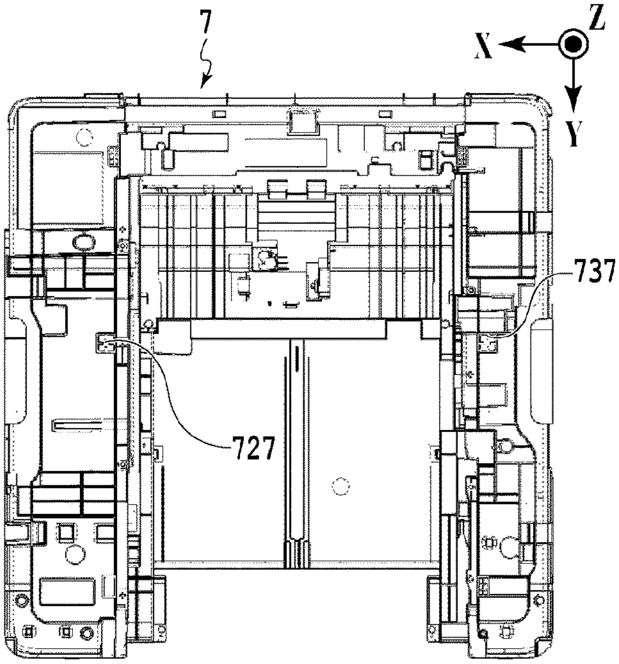
FIG. 25B is a perspective view showing the pivotal support surfaces of the conveyance roller of the conveyance unit.

FIG. 25A is a perspective view showing bearings 321, 322 of the conveyance roller 32 of the conveyance unit 3 and pivotal support surfaces 726 and 736 of the base 7 that pivotally support the bearings 321, 322. The base 7 is provided with the pivotal support surfaces 726 and 736 that pivotally support the bearings 321, 322 of the conveyance roller 32 in the Z-direction, and the bearing 321 of the conveyance roller 32 is supported by the base 7 in the Z-direction. FIG. 25B is a bottom view showing a fifth surface 727 and a sixth surface 737 which are disposed at the bottom surface of the base 7 and have rubber members 96 attached thereto to come into contact with the floor or the like. The fifth surface 727 and the sixth surface 737 are disposed at the bottom surface of the base 7, and rubber members 96 are attached to these surfaces to come into contact with the floor, a desk, or the like during use of the printing apparatus M.

Figure 25C:
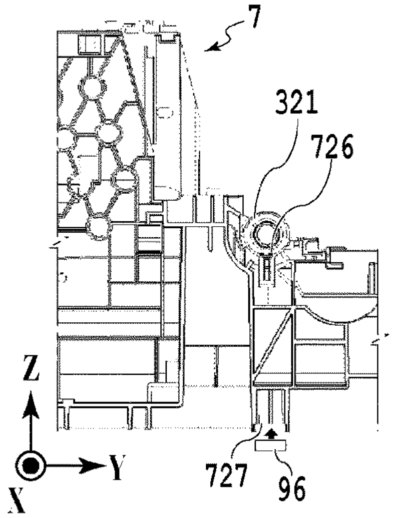
FIG. 25C is a perspective view showing the pivotal support surfaces of the conveyance roller of the conveyance unit.
Figure 25D:
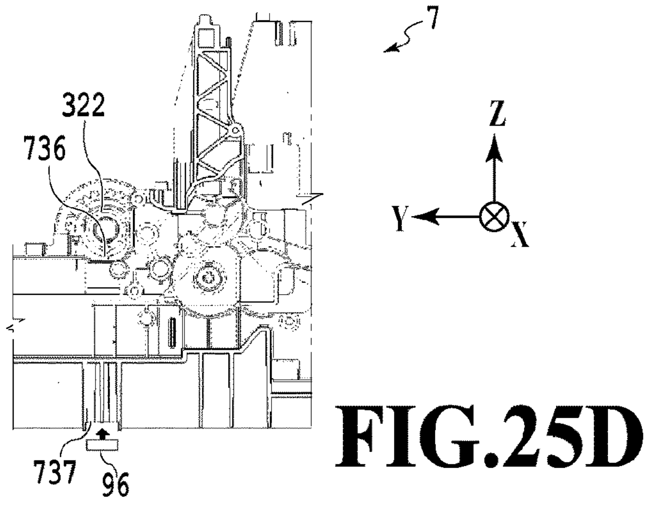
FIG. 25D is a perspective view showing the pivotal support surfaces of the conveyance roller of the conveyance unit.

FIGS. 25C and 25D are diagrams showing the positional relation between the pivotal support surfaces 726, 736 of the base 7 and the fifth surface 727 and the sixth surface 737 on the bottom surface side. As shown in FIGS. 25C and 25D, the fifth surface 727 and the sixth surface 737 are disposed substantially immediately under the pivotal support surfaces 726, 736 of the base 7, respectively.

In the event where the conveyance roller 32 receives a load from the pinch roller (not shown), the load can be transmitted to the pivotal support surface 726 of the base 7 via the bearing 321 and then supported by the floor or desk via the rubber member attached to the fifth surface 727 disposed substantially immediately thereunder. This helps prevent the base 7 from being deformed by the load from the pinch roller and favorably maintain the positional accuracy for the components attached to the base 7.

Other Embodiments

Although the bridging member 45 described above is a sheet metal member, the bridging member 45 may be made of a resin material. Also, although the bridging member 45 is attached to the first sidewall 72 of the base 7 in the example described above, the bridging member 45 may be attached to either one of the first sidewall 72 and the second sidewall 73 of the base 7. Further, the bridging member 45 may be attached to both of the first sidewall 72 and the second sidewall 73.

The positioning and securing between the bridging member 45 and the chassis 44 may be achieved by bonding through welding. Also, although the engagement holes 4411 and 4421 at the lower surface portion of the chassis 44 are provided in the surfaces formed by extension of the bottom surface in the example described above, a different configuration may be employed in which, for example, a hole to engage with an engagement portion, such as a boss, of the base 7 is formed in the lower surface portion of the chassis 44.

Although the circuit board 9 is disposed between the first sidewall 72 of the base 7 and the back surface portion of the chassis 44 in the example described above, the circuit board 9 may be disposed between the second sidewall 73 of the base 7 and the back surface portion of the chassis 44. In that case, the bridging member 45 may be configured to connect the second sidewall 73 of the base 7 and the chassis 44.

There may be at least one of the first positioning shape portion 79 of the base 7 and the second positioning shape portion 4417 of the chassis 44, so that the position of the circuit board 9 may be restricted by either one of the base 7 and the chassis 44.

Figure 26:
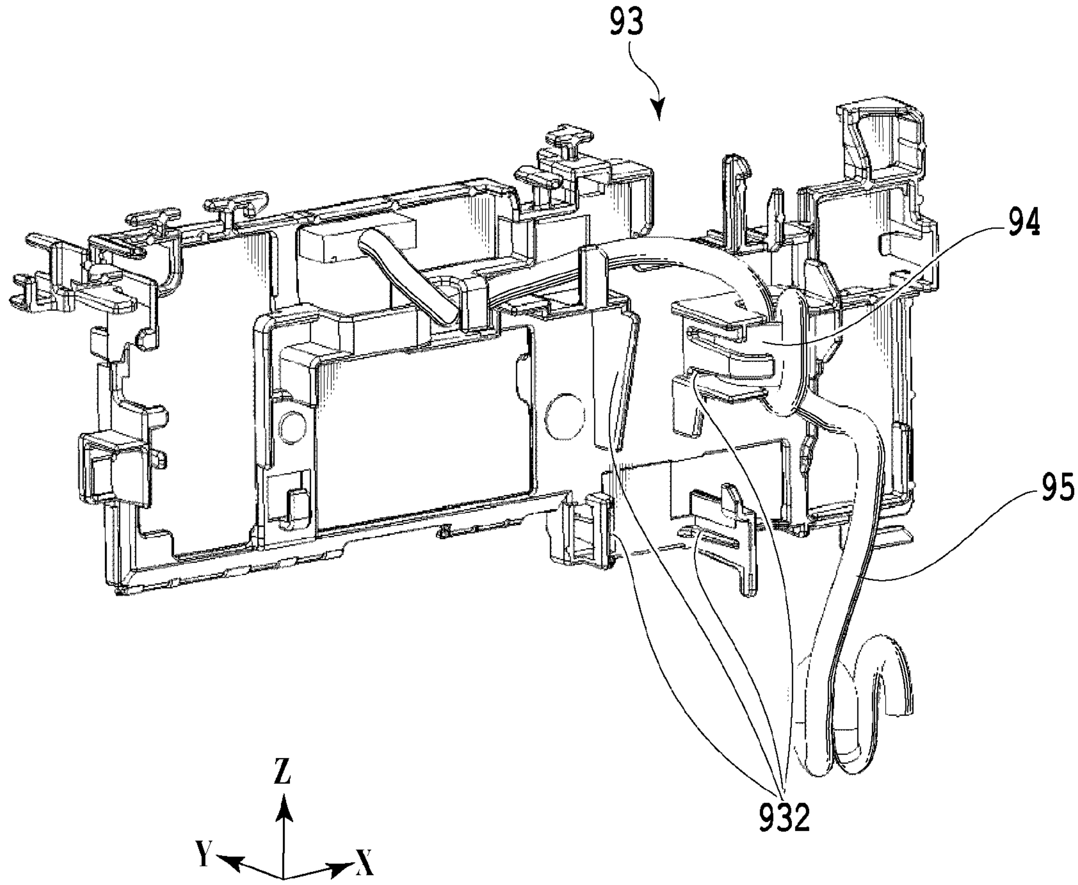
FIG. 26 is a diagram showing restriction shape portions of a guide in a different embodiment.

FIG. 26 is a diagram showing the restriction shape portions 932 of the guide 93 in a different embodiment. As shown in FIG. 26, the restriction shape portions 932 of the guide 93 may be disposed such that they are divided in the middle in the Z-direction, as long as the restriction shape portions 932 are provided at positions to allow the guide 93 to be restricted in position in the X-direction relative to the base 7. Also, the restriction shape portions 932 of the guide 93 do not have to be ribs and may be part of shapes for holding a core 94 for a harness 95 as shown in FIG. 26, as long as the restriction shape portions 932 are shaped to allow the guide 93 to be restricted in position in the X-direction relative to the base 7.

Figure 27:
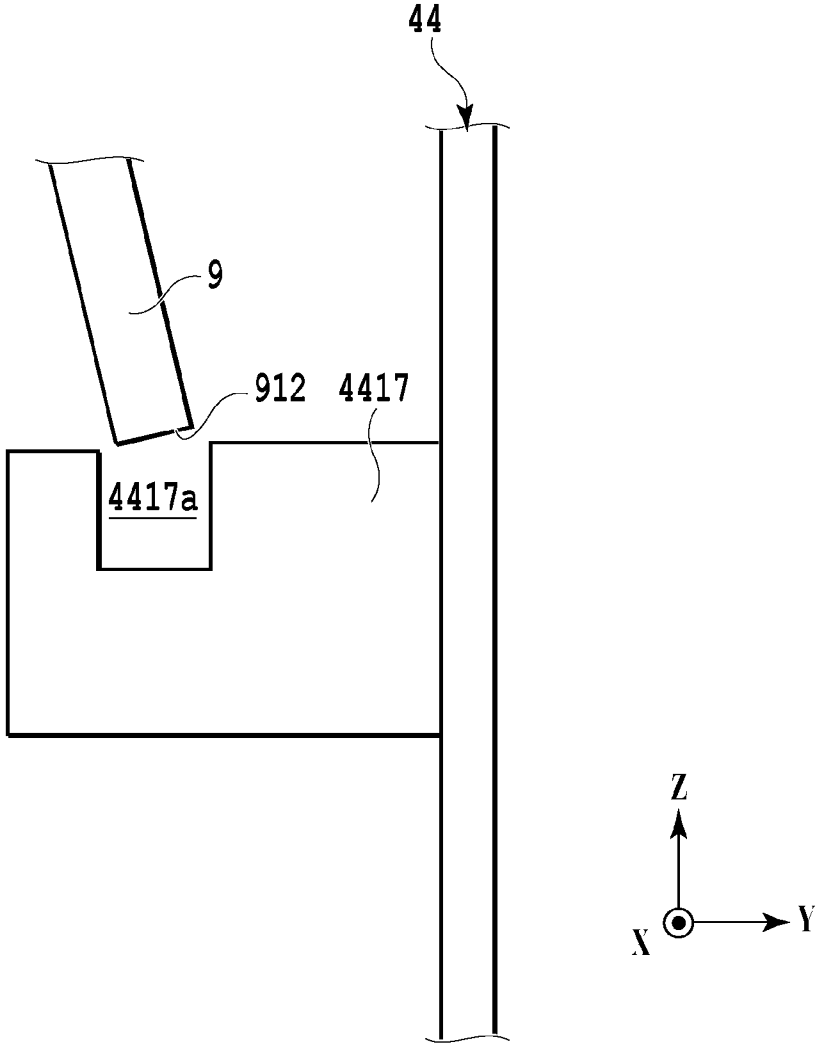
FIG. 27 is a diagram showing a second positioning shape portion in a different embodiment.

FIG. 27 is a diagram showing the second positioning shape portion 4417 of the chassis 44 in a different embodiment. Although the second positioning shape portion 4417 of the chassis 44 is formed by lancing at the chassis 44 in a letter-U shape and includes the recess-shaped portions 4417*a* in the description above, the present disclosure is not limited to this configuration. For example, as shown in FIG. 27, the chassis 44 may be provided with a block-shaped second positioning shape portion 4417, and the notch portion 912 of the circuit board 9 may engage with the recess-shaped portions 4417*a* provided at that second positioning shape portion 4417.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-112455 filed Jul. 13, 2022, which is hereby incorporated by reference herein in its entirety.

What is claimed is:

1. A printing apparatus comprising:
- a printing unit that ejects liquid;
- a carriage on which the printing unit is mounted, the carriage being movable in a scanning direction;
- a base including (1) a flat surface portion, (2) a first sidewall uprightly provided at the flat surface portion, and (3) a second sidewall uprightly provided at the flat surface portion, facing the first sidewall;
- a chassis positioned and held at the base and capable of supporting the carriage while guiding the carriage in the scanning direction; and
- a bridging member connecting the first sidewall and the chassis,
- wherein the bridging member includes a first end portion, which is an end portion of the bridging member in a first direction intersecting with the scanning direction, and
- wherein the bridging member is positioned by engaging the first end portion with a top surface portion of the chassis, the top surface portion being at an end portion of the chassis opposite from an end portion of the chassis secured to the base.

2. The printing apparatus according to claim 1, wherein the bridging member further includes a second end portion in the first direction, and
- wherein the bridging member is positioned by engaging the second end portion with an upper surface portion of the first sidewall, the upper surface portion being provided at a tip end portion in a direction in which the first sidewall is uprightly provided.

3. The printing apparatus according to claim 2, wherein the top surface portion and the upper surface portion are provided at a substantially same height in a direction of upright provision from the base.

4. The printing apparatus according to claim 2, wherein the top surface portion includes a first protrusion portion protruding in a second direction which is a direction of gravitational force and which intersects with the scanning direction and the first direction, and wherein the upper surface portion includes a second protrusion portion protruding in the second direction.

5. The printing apparatus according to claim 4, wherein a portion of the bridging member that engages with the top surface portion is provided with a first engagement hole to engage with the first protrusion portion, and wherein a portion of the bridging member that engages with the upper surface portion is provided with a second engagement hole to engage with the second protrusion portion.

6. The printing apparatus according to claim 5, wherein the first protrusion portion has two protrusions, wherein the first engagement hole has two holes, wherein engagement between one of the protrusions of the first protrusion portion and one of the holes of the first engagement hole restricts the bridging member in one of the scanning direction and the first direction, and wherein engagement between another one of the protrusions of the first protrusion portion and another one of the holes of the first engagement hole restricts the bridging member in another one of the scanning direction and the first direction.

7. The printing apparatus according to claim 4, wherein the chassis is formed of sheet metal, and wherein the first protrusion portion is formed by lancing and is provided extending in the scanning direction.

8. The printing apparatus according to claim 1, wherein the chassis includes a rail formed extending in the scanning direction to guide the carriage in the scanning direction.

9. The printing apparatus according to claim 1, wherein the chassis and the bridging member are fastened by a first fastening member, and wherein the bridging member and at least one of the first sidewall and the second sidewall are fastened by a second fastening member.

10. The printing apparatus according to claim 9, wherein the bridging member is formed of sheet metal and (a) includes a hole for fastening with the first fastening member or (b) includes a hole for fastening with the second fastening member.

11. The printing apparatus according to claim 1, wherein the chassis is positioned by engaging with a first engagement portion and a second engagement portion provided at the base along the scanning direction and is fastened to the base with fastening members.

12. The printing apparatus according to claim 11, wherein the first engagement portion and the second engagement portion are provided protruding in a second direction intersecting with the scanning direction and the first direction, and wherein the chassis is able to be positioned to the base by being moved in the second direction.

13. The printing apparatus according to claim 1, wherein a circuit board is held under the bridging member by a guide and is disposed between the base and the chassis.

14. The printing apparatus according to claim 1, wherein the chassis is fastened to the first sidewall via the bridging member and is also fastened to the second sidewall.

15. The printing apparatus according to claim 1, further comprising a conveyance unit that conveys a printing medium in the first direction.

* * * * *